United States Patent
Kurahashi

(10) Patent No.: US 8,126,055 B2
(45) Date of Patent: Feb. 28, 2012

(54) TELOP DETECTING METHOD, TELOP DETECTING PROGRAM, AND TELOP DETECTING DEVICE

(75) Inventor: Makoto Kurahashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 1351 days.

(21) Appl. No.: 11/660,360

(22) PCT Filed: Aug. 2, 2005

(86) PCT No.: PCT/JP2005/014109
§ 371 (c)(1),
(2), (4) Date: Apr. 17, 2007

(87) PCT Pub. No.: WO2006/018970
PCT Pub. Date: Feb. 23, 2006

(65) Prior Publication Data
US 2007/0274387 A1    Nov. 29, 2007

(30) Foreign Application Priority Data
Aug. 19, 2004    (JP) .............................. 2004-239991

(51) Int. Cl.
*H04N 7/12* (2006.01)
*H04N 9/80* (2006.01)
*G11B 27/00* (2006.01)
H04N 5/278 (2006.01)
G06K 9/00 (2006.01)
G06K 9/03 (2006.01)
G06K 9/20 (2006.01)

(52) U.S. Cl. ......... 375/240.13; 375/240.12; 375/240.16; 386/246; 386/283

(58) Field of Classification Search ............. 375/240.13, 375/240.12; 386/83
See application file for complete search history.

(56) References Cited

U.S. PATENT DOCUMENTS

| 5,828,782 A | 10/1998 | Sunakawa et al. |
| 2004/0228616 A1* | 11/2004 | Miyasato et al. ............... 386/83 |

FOREIGN PATENT DOCUMENTS

| JP | 6-292018 A | 10/1994 |
| JP | 9-46519 A | 2/1997 |
| JP | 9-322173 A | 12/1997 |
| JP | 2001285716 A * | 10/2001 |
| JP | 2002-064748 A | 2/2002 |
| WO | WO 02/093910 A1 | 11/2002 |

OTHER PUBLICATIONS

Kuwano, H.; Kurakake, S.; Odaka, K.; "Telop character extraction from video data", Document Image Analysis, 1997. (DIA '97) Proceedings., Workshop on Digital Object Identifier: 10.1109/DIA. 1997.627096, Publication Year: May 1997, pp. 82-88.*

* cited by examiner

*Primary Examiner* — Eleni Shiferaw
*Assistant Examiner* — Courtney Fields
(74) *Attorney, Agent, or Firm* — Foley & Lardner LLP

(57) ABSTRACT

A telop detecting device includes an MPEG input source, a parameter acquiring unit, a switch, a DCT coefficient evaluating unit, and a result output unit. The MPEG input source acquires an MPEG stream. The parameter acquiring unit acquires parameters necessary for detecting a telop from the MPEG input source. The switch switches on and off the connection to the DCT coefficient evaluating unit. The DCT coefficient evaluating unit evaluates the possibility of presence of a telop based on a DCT coefficient of each macro block in a frame acquired through the switch, identifies a telop region by calculating an evaluation value by assigning a weight to the DCT coefficient using a weighting matrix.

14 Claims, 25 Drawing Sheets

TELOP DETECTING METHOD, TELOP DETECTING PROGRAM, AND TELOP DETECTING DEVICE

TECHNICAL FIELD

The present invention relates to a telop detecting method, a telop detecting program, and a telop detecting device for detecting telops. However, use of the present invention is not limited to the above telop detecting method, the telop detecting program, and the telop detecting device.

BACKGROUND ART

Conventionally, a method is provided in which moving image data in which a telop portion of the moving image is encoded is directly extracted without decoding. This method includes a step of judging whether the encoded moving image data is a frame that is encoded using a correlation between frames or a frame that is encoded without using correlation between frames; a step of determining, for the frame that is encoded using a correlation between frames, whether a pixel therein is encoded without applying motion compensation; a step of storing an encoded value in a two-dimensional counting matrix corresponding to the position of the pixel; a step of comparing the value stored in each counting matrix with a threshold value; and a step of identifying a pixel having a value determined to be larger than the threshold value as the telop portion. Such an operation is executed to each pixel in a predetermined area, and the telop of the moving image can be extracted by reviewing the operations (see, for example, Patent Document 1 below).

A telop region detecting apparatus has been proposed that can detect appearance of a telop at a high speed and with high precision and can extract the position of the telop in a frame from compressed-encoded data itself or from information formed by encoding only a portion thereof. In the telop region detecting apparatus, only necessary information is decoded partially from the encoded data by a variable length decoding unit and the decoded information is delivered to a time change judging unit, a telop position judging unit, and an appearing frame judging unit. The time change judging unit sets in I picture a region that is a candidate telop region. The telop position judging unit picks up a block having an encoding mode suitable for the telop from the I picture. The appearing frame judging unit executes a frame judging process that judges from which frame the telop appears (see, for example, Patent Document 2 below).

Patent Document 1: Japanese Patent Application Laid-Open Publication No. H9-322173
Patent Document 2: Japanese Patent Application Laid-Open Publication No. 2002-64748

DISCLOSURE OF INVENTION

Problem to be Solved by the Invention

However, according to the conventional technique of Patent Document 1, generally, even a region that is between-frame-estimated without applying motion compensation may include a stationary region, and therefore, the region is not always a telop and a problem that the detection precision is degraded can be listed as an example.

According to the conventional technique of Patent Document 2, because the timing to detect a telop is limited to the time when the telop appears, a problem can be listed as an example that it is difficult to cope with a telop such as the one that appears in a specific way such as fading in or sequential appearance of characters, a telop that appears simultaneously with the change of scenes, or a small telop.

As a region other than that for a telop, regions are present that each have brightness and color difference varying often in a space region may be present and a problem can be listed as an example that it is difficult to distinguish these regions from a telop.

Means for Solving Problem

A telop detecting method as described herein includes an acquiring step of acquiring an intraframe predictive coded picture from a series of frames concerning a compressed-encoded moving image using an orthogonal transformation from a space region to a frequency region; an extracting step of extracting an arbitrary block from the intraframe predictive coded picture acquired at the acquiring step; a calculating step of calculating an evaluation value that indicates a possibility of a presence of a telop in the block by weighting a frequency component of an arbitrary frequency band in the block extracted at the extracting step, using a weighting matrix in which a value weighting a frequency component of another frequency band having higher frequency than the frequency band is high; and a detecting step of detecting a telop region that includes the telop from the frame based on the evaluation value calculated at the calculating step.

A telop detecting method as described herein includes a first intraframe predictive coded picture acquiring step of acquiring a first intraframe predictive coded picture from a series of frames concerning a moving image that is compressed-encoded using an orthogonal transformation from the space region to the frequency region; a first extracting step of extracting an arbitrary first block from the first intraframe predictive coded picture acquired at the first intraframe predictive coded picture acquiring step; a first calculating step of calculating a first evaluation value that indicates the possibility of including a telop in a first block by weighting a frequency component in the first block using a weighting matrix for which, compared to a value that weights a frequency component of an arbitrary frequency band in the first block extracted at the first extracting step, a value that weights a frequency component of another frequency band that is higher than the arbitrary frequency band in the block is higher, for the frequency component of an arbitrary frequency band in the first block extracted at the extracting step; a first detecting step of detecting a telop region including the telop from the first block based on the first evaluation value calculated at the first calculating step; an interframe predictive coded picture acquiring step of acquiring an interframe predictive coded picture input after the first intraframe predictive coded picture from the series of frames; a second extracting step of extracting a second block corresponding to an appearing position of the first block from the interframe predictive coded picture acquired at the interframe predictive coded picture acquiring step; an updating step of updating a frequency component of the first block from which the telop region has been detected at the first detecting step using a frequency component of the second block extracted at the second extracting step; a second intraframe predictive coded picture acquiring step of acquiring a second intraframe predictive coded picture input immediately after the first intraframe predictive coded picture acquiring from the series of frames; a third extracting step of extracting a third block corresponding to the appearing positions of the first and the second blocks from the second intraframe predictive coded picture acquired at the second intraframe predictive coded picture acquiring step; a second calculating step of calculating a second evaluation value that indicates the possibility of including the telop in the third block extracted at the third extracting step by weighting a frequency component updated at the updating step using the weighting matrix; and a second detecting step of detecting a telop region same as the telop region from the third block based on the second evaluation value calculated at the second calculating step.

A telop detecting method as described herein includes an interframe predictive coded picture acquiring step of acquiring an interframe predictive coded picture from a series of frames concerning a moving image that is compressed-encoded using an orthogonal transformation from the space region to the frequency region and a between-frame correlation; a macro block extracting step of extracting an arbitrary macro block to be noted (hereinafter, "notable macro block") and at least any one macro block of macro blocks present surrounding the notable macro block (hereinafter, "surrounding macro block") from the interframe predictive coded picture acquired at the interframe predictive coded picture acquiring step; a first calculating step of calculating an evaluation value that indicates the possibility of including a telop in the notable macro block based on a motion vector of the notable macro block extracted at the macro block extracting step and a motion vector of the surrounding macro block extracted at the first macro block extracting step; an intraframe predictive coded picture acquiring step of acquiring an intraframe predictive coded picture input after the interframe predictive coded picture from the series of frames; a block extracting step of extracting a block in the macro block corresponding to an appearing position of the notable block from the intraframe predictive coded picture acquired at the intraframe predictive coded picture acquiring step; a second calculating step of calculating a second evaluation value that indicates the possibility of including the telop in the block by weighting a frequency component in the block using a weighting matrix for which, compared to a value that weights a frequency component of an arbitrary frequency band in the block extracted at the block extracting step, a value that weights a frequency component of another frequency band that is higher than the arbitrary frequency band in the block is higher, for the frequency component of an arbitrary frequency band in the block extracted at the block extracting step; and a detecting step of detecting a telop region including the telop based on the first and the second evaluation values calculated at the first and the second calculating steps.

A telop detecting program as described herein causes a computer to execute an acquiring step of acquiring an intraframe predictive coded picture from a series of frames concerning a compressed-encoded moving image using an orthogonal transformation from a space region to a frequency region; an extracting step of extracting an arbitrary block from the intraframe predictive coded picture acquired at the acquiring step; a calculating step of calculating an evaluation value that indicates a possibility of a presence of a telop in the block by weighting a frequency component of an arbitrary frequency band in the block extracted at the extracting step, using a weighting matrix in which a value weighting a frequency component of another frequency band having higher frequency than the frequency band is high; and a detecting step of detecting a telop region that includes the telop from the frame based on the evaluation value calculated at the calculating step.

A telop detecting program as described herein causes a computer to execute a first intraframe predictive coded picture acquiring step of acquiring a first intraframe predictive coded picture from a series of frames concerning a moving image that is compressed-encoded using an orthogonal transformation from the space region to the frequency region; a first extracting step of extracting an arbitrary first block from the first intraframe predictive coded picture acquired at the first intraframe predictive coded picture acquiring step; a first calculating step of calculating a first evaluation value that indicates the possibility of including a telop in a first block by weighting a frequency component in the first block using a weighting matrix for which, compared to a value that weights a frequency component of an arbitrary frequency band in the first block extracted at the first extracting step, a value that weights a frequency component of another frequency band that is higher than the arbitrary frequency band in the block is higher, for the frequency component of an arbitrary frequency band in the first block extracted at the extracting step; a first detecting step of detecting a telop region including the telop from the first block based on the first evaluation value calculated at the first calculating step; an interframe predictive coded picture acquiring step of acquiring an interframe predictive coded picture input after the first intraframe predictive coded picture from the series of frames; a second extracting step of extracting a second block corresponding to an appearing position of the first block from the interframe predictive coded picture acquired at the interframe predictive coded picture acquiring step; an updating step of updating a frequency component of the first block from which the telop region has been detected at the first detecting step using a frequency component of the second block extracted at the second extracting step; a second intraframe predictive coded picture acquiring step of acquiring a second intraframe predictive coded picture input immediately after the first intraframe predictive coded picture acquiring from the series of frames; a third extracting step of extracting a third block corresponding to the appearing positions of the first and the second blocks from the second intraframe predictive coded picture acquired at the second intraframe predictive coded picture acquiring step; a second calculating step of calculating a second evaluation value that indicates the possibility of including the telop in the third block extracted at the third extracting step by weighting a frequency component updated at the updating step using the weighting matrix; and a second detecting step of detecting a telop region same as the telop region from the third block based on the second evaluation value calculated at the second calculating step.

A telop detecting program as described herein causes a computer to execute an interframe predictive coded picture acquiring step of acquiring an interframe predictive coded picture from a series of frames concerning a moving image that is compressed-encoded using an orthogonal transformation from the space region to the frequency region and a between-frame correlation; a macro block extracting step of extracting an arbitrary macro block to be noted (hereinafter, "notable macro block") and at least any one macro block of macro blocks present surrounding the notable macro block (hereinafter, "surrounding macro block") from the interframe predictive coded picture acquired at the interframe predictive coded picture acquiring step; a first calculating step of calculating an evaluation value that indicates the possibility of including a telop in the notable macro block based on a motion vector of the notable macro block extracted at the macro block extracting step and a motion vector of the surrounding macro block extracted at the first macro block extracting step; an intraframe predictive coded picture acquiring step of acquiring an intraframe predictive coded picture input after the interframe predictive coded picture from the series of frames; a block extracting step of extracting a block in the macro block corresponding to an appearing position of the notable block from the intraframe predictive coded picture acquired at the intraframe predictive coded picture acquiring step; a second calculating step of calculating a second evaluation value that indicates the possibility of including the telop in the block by weighting a frequency component in the block using a weighting matrix for which, compared to a value that weights a frequency component of an arbitrary frequency band in the block extracted at the block extracting step, a value that weights a frequency component of another frequency band that is higher than the arbitrary frequency band in the block is higher, for the frequency component of an arbitrary frequency band in the block extracted at the block extracting step; and a detecting step of detecting a telop region including the telop based on the first and the second evaluation values calculated at the first and the second calculating steps.

A telop detecting device as described herein includes an acquiring unit that acquires an intraframe predictive coded picture from a series of frames concerning a compressed-encoded moving image using an orthogonal transformation from a space region to a frequency region; an extracting unit that extracts an arbitrary block from the intraframe predictive coded picture acquired by the acquiring unit; a calculating unit that calculates an evaluation value that indicates a possibility of a presence of a telop in the block by weighting a frequency component of an arbitrary frequency band in the block extracted by the extracting unit, using a weighting matrix in which a value weighting a frequency component of another frequency band having higher frequency than the frequency band is high; and a detecting unit that detects a telop region that includes the telop from the frame based on the evaluation value calculated by the calculating unit.

A telop detecting device as described herein includes a first intraframe predictive coded picture acquiring unit that acquires a first intraframe predictive coded picture from a series of frames concerning a moving image that is compressed-encoded using an orthogonal transformation from the space region to the frequency region; a first extracting unit that extracts an arbitrary first block from the first intraframe predictive coded picture acquired by the first intraframe predictive coded picture acquiring unit; a calculating unit that calculates a first evaluation value that indicates the possibility of including a telop in a first block by weighting a frequency component in the first block using a weighting matrix for which, compared to a value that weights a frequency component of an arbitrary frequency band in the first block extracted at the first extracting step, a value that weights a frequency component of another frequency band that is higher than the arbitrary frequency band in the block is higher, for the frequency component of an arbitrary frequency band in the first block extracted by the extracting unit; a detecting unit that detects a telop region including the telop from the first block based on the first evaluation value calculated by the calculating unit; an interframe predictive coded picture acquiring unit that acquires an interframe predictive coded picture input after the first intraframe predictive coded picture from the series of frames; a second extracting unit that extracts a second block corresponding to an appearing position of the first block from the interframe predictive coded picture acquired by the interframe predictive coded picture acquiring unit; and an updating unit that updates a frequency component of the first block from which the telop region has been detected by the detecting unit using a frequency component of the second block extracted by the second extracting unit. The intraframe predictive coded picture acquiring unit acquires a second intraframe predictive coded picture input next to the first intraframe predictive coded picture from the series of frames, the first extracting unit extracts a third block corresponding to the appearing positions of the first and the second blocks from the second intraframe predictive coded picture acquired by the intraframe predictive coded picture acquiring unit, the calculating unit calculates a second evaluation value that indicates the possibility of including the telop in the third block extracted by the first extracting unit by weighting a frequency component updated by the updating unit using the weighting matrix, and the detecting unit detects a telop region same as the telop region, from the third block based on the second evaluation value calculated by the calculating unit.

A telop detecting device as described herein includes an interframe predictive coded picture acquiring unit that acquires an interframe predictive coded picture from a series of frames concerning a moving image that is compressed-encoded using an orthogonal transformation from the space region to the frequency region and a interframe correlation; a macro block extracting unit that extracts an arbitrary macro block to be noted (hereinafter, "notable macro block") and at least any one macro block of macro blocks present surrounding the notable block (hereinafter, "surrounding macro block") from the interframe predictive coded picture acquired by the interframe predictive coded picture acquiring unit; a first calculating unit that calculates an evaluation value that indicates the possibility of including a telop in the notable macro block based on a motion vector of the notable macro block extracted by the macro block extracting unit and a motion vector of the surrounding macro block extracted by the first macro block extracting unit; an intraframe predictive coded picture acquiring unit that acquires an intraframe predictive coded picture input after the interframe predictive coded picture from the series of frames; a block extracting unit that extracts a block in the macro block corresponding to an appearing position of the notable macro block from the intraframe predictive coded picture acquired by the intraframe predictive coded picture acquiring unit; a second calculating unit that calculates a second evaluation value that indicates the possibility of including the telop in the block by weighting a frequency component in the block using a weighting matrix for which, compared to a value that weights a frequency component of an arbitrary frequency band in the block extracted by the block extracting unit, a value that weights a frequency component of another frequency band that is higher than the arbitrary frequency band in the block is higher, for the frequency component of an arbitrary frequency band in the block extracted by the block extracting unit; and a detecting unit that detects a telop region including the telop based on the first and the second evaluation values calculated by the first and the second calculating units.

EXPLANATIONS OF LETTERS OR NUMERALS

Figure 1:
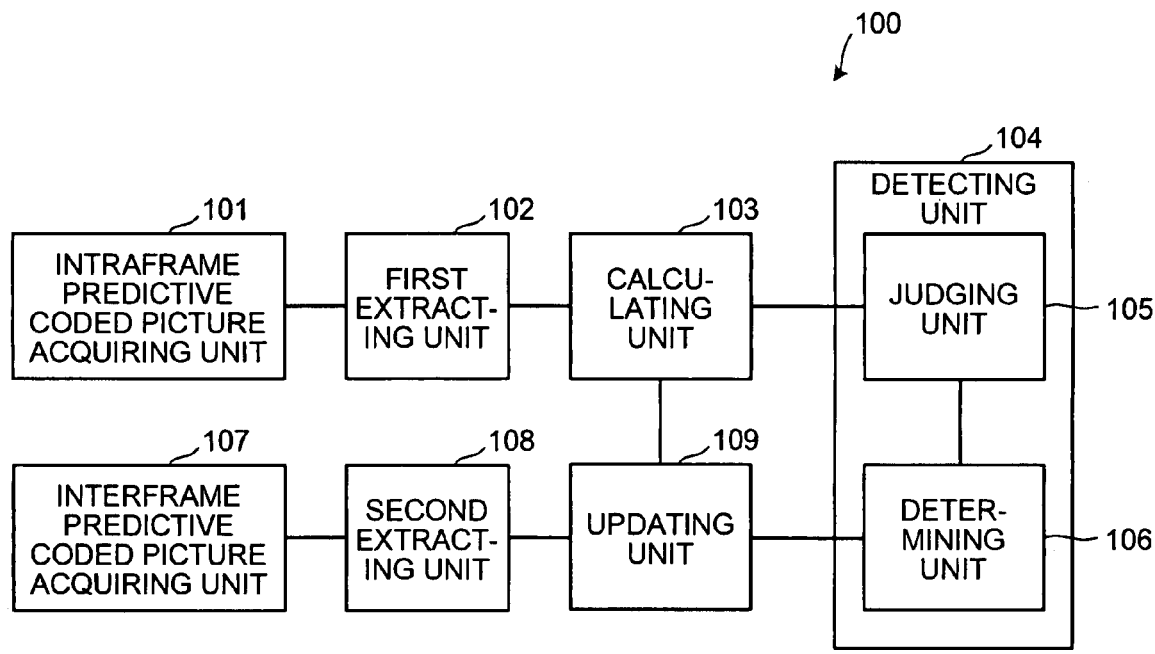
FIG. 1 is a block diagram of the functional configuration of a telop detecting device according to a first embodiment.

100, 500 telop detecting device
101, 504 intraframe predictive coded picture acquiring unit,
102 first extracting unit
103 calculating unit
104, 507 detecting unit
105, 508 judging unit
106, 509 determining unit
107, 501 interframe predictive coded picture acquiring unit
108 second extracting unit
109 updating unit
502 macro block extracting unit
503 first calculating unit
505 block extracting unit
510 discriminating unit
511 output unit

BEST MODE(S) FOR CARRYING OUT THE INVENTION

With reference to the accompanying drawings, exemplary embodiments of a telop detecting method, a telop detecting program, and a telop detecting device according to the present invention is explained in detail.

First Embodiment (Functional Configuration of Telop Detecting Device)

Description will be given for a functional configuration of a telop detecting device according to a first embodiment. FIG. 1 is a block diagram of the functional configuration of the telop detecting device according to the first embodiment. As shown in FIG. 1, a telop detecting device 100 includes an intraframe predictive coded picture acquiring unit 101, a first extracting unit 102, a calculating unit 103, and a detecting unit 104. The intraframe predictive coded picture acquiring unit 101 acquires a frame that is intraframe prediction coded from a series of frames concerning a moving image that is compressed-encoded.

The series of frames concerning the moving image is, specifically, a set of moving images that are compressed-encoded using orthogonal transformation from a space region to a frequency region. The series of frames of the moving image is, for example, a series of frame images that is compressed-encoded in the MPEG format, and configured by frames that are intraframe predictive coded (intraframe predictive coded pictures) and frames that are interframe predictive coded (interframe predictive coded pictures). The intraframe predictive coded picture acquiring unit 101 acquires an intraframe predictive coded picture from the series of frames.

The first extracting unit 102 extracts an arbitrary block from the intraframe predictive coded picture acquired by the intraframe predictive coded picture acquiring unit 101. A "block" used herein is one unit region of an orthogonally transformed version of the acquired frame. Especially for the MPEG, the block is a unit item to execute a DCT and is image data of eight by eight dots constituted by DCT coefficients. The block constitutes a macro block of an intraframe predictive coded picture. More specifically, the block may be at least any one of four Y signals representing brightness information of six blocks (four Y signals, Cr signal, and Cb signal) constituting the macro block. However, the brightness information and the color difference information (Cr signal and Cb signal) may be extracted being combined or only the color difference signal may be extracted.

The calculating unit 103 calculates an evaluation value (hereinafter, "first evaluation value") that indicates the possibility that a telop is included in the block, by weighting the DCT coefficient in the block extracted by the first extracting unit 102 using a weighting matrix.

Figure 2:
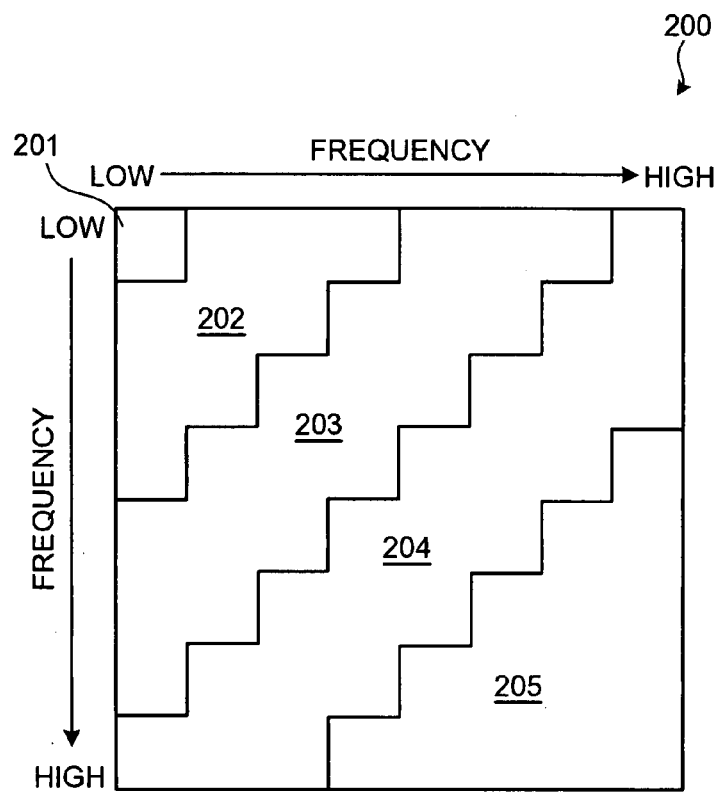
FIG. 2 is a diagram for explaining an example of a macro block weighted by a weighting matrix.

The weighting matrix is a matrix for which, compared to a value that weights a DCT coefficient of an arbitrary frequency band in a block, a value that weights a DCT coefficient of another frequency band that is higher than the arbitrary frequency band in the block is higher. Description will be given for an example of a block weighted by the weighting matrix. FIG. 2 is a diagram for explaining an example of a block weighted by a weighting matrix.

As shown in FIG. 2, for a DCT coefficient in a block 200, the frequency becomes lower as the coefficient moves to the upper left and becomes higher as the coefficient moves to lower right. That is, a region 201 in the leftmost and uppermost portion has a DCT coefficient of a DC component and is a region having the lowest frequency. Other regions 202 to 205 each have a DCT coefficient of an AC component. In the regions 202 to 205, regions divided according to frequency bands are present and the frequency becomes higher in order of the regions 202, 203, 204, and 205. These regions 201 to 205 are respectively referred to as frequency bands 201 to 205.

Therefore, in the weighting matrix, weighting of a DCT coefficient (DCT component) for the frequency band 201 is set to be "zero". Compared to a value that weights a DCT coefficient of the frequency band 202, a value that weights DCT coefficients of the other frequency bands 203 to 205 that have higher frequencies than that of the frequency band 202 is set to be larger.

In addition, compared to a value that weights DCT coefficient of the frequency band 203, a value that weights DCT coefficients of the other frequency bands 204 to 205 that have higher frequencies than that of the frequency band 203 is set to be larger. Compared to a value that weights a DCT coefficient of the frequency band 204, a value that weights a DCT coefficient of the other frequency bands 205 that has higher frequencies than that of the frequency band 204 is set to be larger.

In this manner, by calculating a first evaluation value using a weighting matrix, the possibility that a telop is included in an image in a block can be represented as a numeral. Although the frequency bands 202 to 205 are formed by dividing the AC component of the DCT coefficient into four in FIG. 2, the number into which the AC component is divided may be in a region that is two or more.

Description will be given in detail for a telop. A telop is a caption or a picture superimposed on a natural image that is a series of frames constituting video contents. When a telop is present in a block, an edge (abrupt variation of a brightness value and a color difference value) is present on a border portion of a telop in the space region.

Because this is related to the visibility of a telop that is an information transmitting means utilizing the visual sense, this property is common to many telops. It is known that an image including such a steep edge as this has a value having a large absolute value that appears in a frequency component in a frequency band. Utilizing this property, the calculating unit 103 calculates the first evaluation value that is a value representing the possibility of including a telop as a numeral by further increasing a DCT coefficient using a weighting matrix for a high frequency component of the DCT coefficient.

The detecting unit 104 shown in FIG. 1 detects a telop region including a telop therein from a block based on the first evaluation value calculated by the calculating unit 103. More specifically, the detecting unit 104 includes a judging unit 105 and a determining unit 106. The judging unit 105 judges whether the first evaluation value calculated by the calculating unit 103 is equal to or larger than a predetermined first threshold value.

When the first evaluation value is judged to be equal to or larger than the predetermined first threshold value, the determining unit 106 determines a block extracted by the first extracting unit 102 as a telop region. When the first evaluation value is judged not to be equal to or larger than the predetermined first threshold value, the determining unit 106 determines the block extracted by the first extracting unit 102 as a non-telop region.

According to the above configurations, focusing on a high-frequency component of a DCT coefficient to detect a steep edge that is a feature of a telop, a block may be extracted as a candidate telop when the value is large. Thereby, distinction between a "noisy part present in a natural image, having mainly a relatively low frequency component therein and a high DCT coefficient appearing therein" and a "telop part inserted artificially, having a high DCT coefficient that tends to appear in a high-frequency component" can be executed with higher precision.

The telop detecting device 100 includes an interframe predictive coded picture acquiring unit 107, a second extracting unit 108, and an updating unit 109. The interframe predictive coded picture acquiring unit 107 acquires an interframe predictive coded picture input following an intraframe predictive coded picture (hereinafter, "first intraframe predictive coded picture" in the first embodiment) acquired by the intraframe predictive coded picture acquiring unit 101 from the series of frames. The interframe predictive coded picture is a P picture or a B picture following the first intraframe predictive coded picture.

The second extracting unit 108 extracts a block (hereinafter, "second block" in the first embodiment) corresponding to the appearing position of the block (hereinafter, "first block" in the first embodiment) extracted by the first extracting unit 102 from the interframe predictive coded picture acquired by the interframe predictive coded picture acquiring unit 107. Similarly to the case of the first extracting unit 102, the "block" refers to a unit region of the orthogonal transformation in the frame acquired. Especially, in the case of MPEG, a block is a unit region for executing DCT and is image data of eight by eight dots constituted by DCT coefficients. More specifically, this block constitutes a compressed encoded macro block of an interframe predictive coded picture. More specifically, this block may be at least any one of the four Y signals representing brightness information of the six blocks (four Y signals, Cr signal, Cb signal) constituting a macro block. However, the brightness information and the color difference information (Cr signal and Cb signal) may be extracted being combined or only the color difference signal may be extracted.

The updating unit 109 updates the DCT coefficient of the first block for which the detecting unit 104 has detected the telop region, using the DCT coefficient of the second block that the second extracting unit 108 has extracted. More specifically, the updating unit 109 updates the DCT coefficient of the first block determined to be the telop region by the determining unit 106 and retains the DCT coefficient after being updated.

When the second block extracted by the second extracting unit 108 and the first block are in the same position, the updating unit 109 updates the retained DCT coefficient using the DCT coefficient of the second block extracted by the second extracting unit 108. The updating unit 109 executes this updating every time the second extracting unit 108 newly extracts another second block until the next intraframe predictive coded picture (I picture) is acquired. The specific updating process will be described later.

The intraframe predictive coded picture acquiring unit 101 acquires an intraframe predictive coded picture (hereinafter, "second intraframe predictive coded picture" in the first embodiment) input next to the first intraframe predictive coded picture from the series of frames. In this case, the first extracting unit 102 extracts a block (hereinafter, "third block" in the first embodiment) corresponding to the appearing position of the first block and the second block from the second intraframe predictive coded picture acquired by the intraframe predictive coded picture acquiring unit 101.

Using the above weighting matrix, the calculating unit 103 calculates an evaluation value (hereinafter, "second evaluation value" in the first embodiment) indicating the possibility that a telop is included in the third block extracted by the first extracting unit 102 by weighting the DCT coefficient updated by the updating unit 109. The specific calculation of the second evaluation value will be described later.

Based on the second evaluation value calculated by the calculating unit 103, the detecting unit 104 detects a telop region same as the telop region from the third block. More specifically, the judging unit 105 judges whether the second evaluation value calculated by the calculating unit 103 is equal to or larger than a predetermined second threshold value.

When the judging unit 105 judges that the second evaluation value is equal to or larger than a predetermined second threshold value, the determining unit 106 determines the third block extracted by the first extracting unit 102 as the telop region that is same as the telop region of the preceding determination.

When the judging unit 105 judges that the second evaluation value is not equal to or larger than a predetermined second threshold value, the determining unit 106 determines the third block extracted by the first extracting unit 102 as a region that is not the telop region that is same as the telop region of the preceding determination.

More specifically, when a telop is included in the third block, the telop is a telop that is different from the telop included in the telop region determined by the first extracting unit 102. Therefore, switching of the telop in the third frame can be detected. When no telop is included in the third frame, it can be detected that the telop of the first intraframe predictive coded picture is deleted in the second intraframe predictive coded picture.

In addition to the first intraframe predictive coded picture, these configurations use the DCT coefficient of the interframe predictive coded picture, that is, the DCT coefficient of a differential image between the frames, for detecting telops. In the MPEG, except an intra macro block, an interframe predictive coded picture is presented as a differential image between this image and the image that is the origin of the estimation and the DCT coefficient of the differential image is encoded. In this case, the case where the difference is zero is included.

Figure 3:
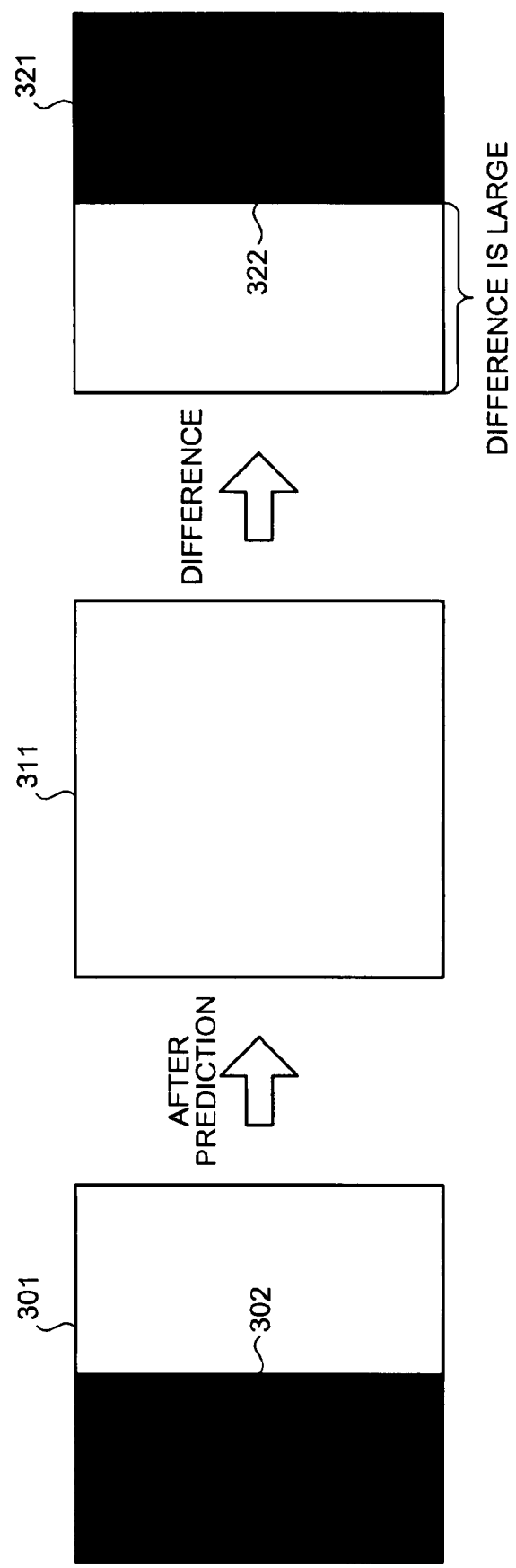
FIG. 3 is diagram for explaining a differential image.

Description will be given for a differential image. FIG. 3 is diagram for explaining a differential image. As shown in FIG. 3, an edge 302 is present in an arbitrary position in an estimation origin image 301. When the edge 302 has disappeared in an image (estimated image) 311 after the estimation, in a differential image 321 between the estimation origin image 301 and the estimated image 311, a new edge 322 has generated in the same position as the position of the edge 302 in the estimation origin image 301. The DCT coefficient of the differential image 321 generates with the same absolute value and in the same position as that of the DCT coefficient of the estimation origin image 301.

Generally, once displayed, a telop stays still. From this fact, for a region that is judged to be a telop in a first frame that is intraframe prediction coded, due to the above nature of a telop, the precision of the telop detection can be improved by capturing the behavior of the edge from the DCT coefficient of a second frame that is interframe prediction coded. Thereby, a discontinuing point between telops can be detected when another telop is present continuously in the same position.

(Procedure of Telop Detecting Process)

Figure 4:
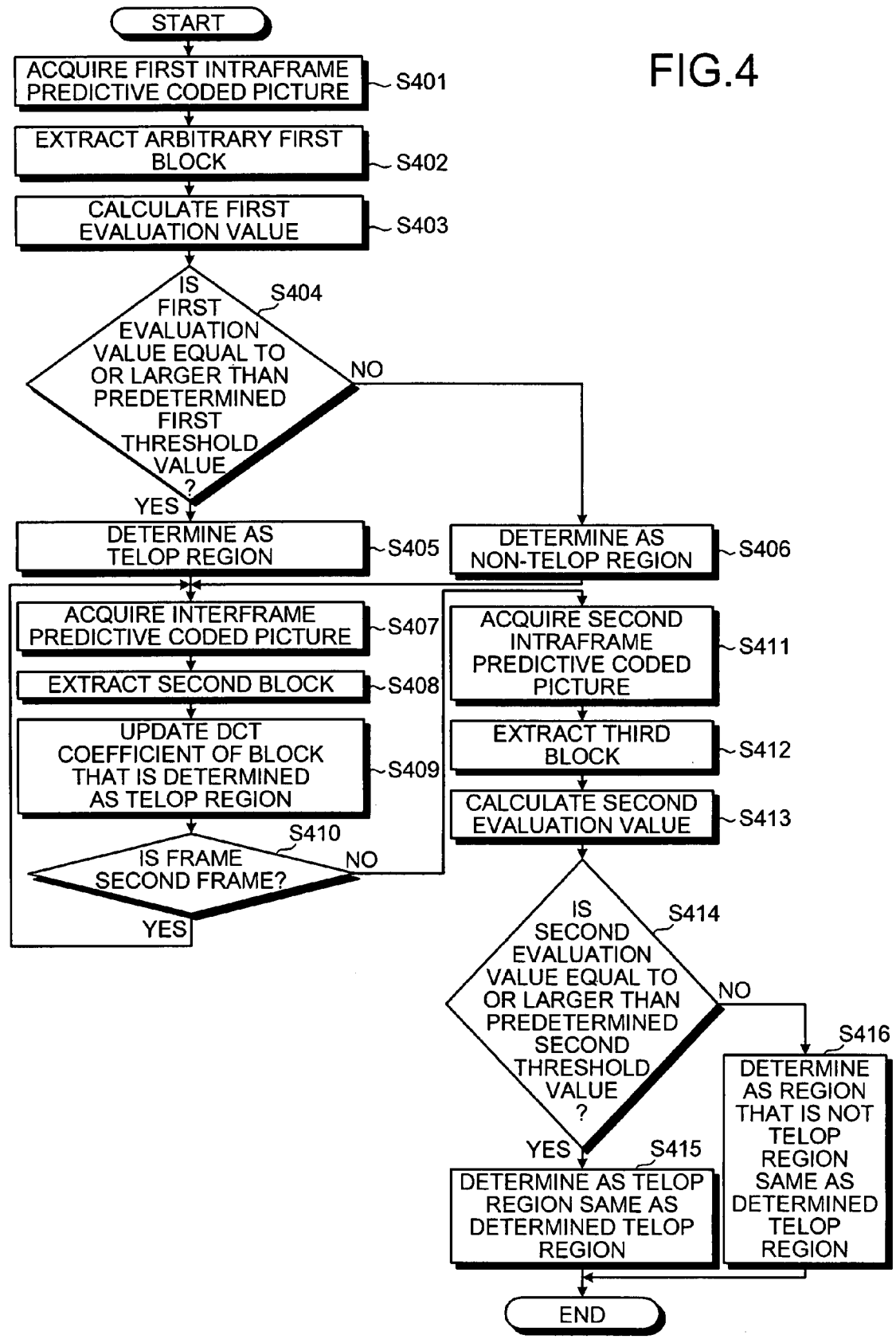
FIG. 4 is a flowchart of a telop detecting process according to the first embodiment.

Description will be given for a procedure of a telop detecting process according to the first embodiment. FIG. 4 is a flowchart of the telop detecting process according to the first embodiment. As shown in FIG. 4, the first intraframe predictive coded picture that is intraframe prediction coded is acquired from a series of frames (step S401). An arbitrary first block is extracted from the first intraframe predictive coded picture acquired (step S402).

Using a weighting matrix, the first evaluation value that indicates the possibility that a telop is included in the first block extracted is calculated (step S403). When this first evaluation value calculated is equal to or larger than the predetermined first threshold value (step S404: YES), the first block is determined to be a telop region (step S405). When the first evaluation value is not equal to or larger than the predetermined first threshold value (step S404: NO), the first block is determined to be a non-telop region (step S406).

Thereby, a noisy region that is present in a natural image and a telop region inserted artificially can be distinguished from each other and the telop region can be detected with high precision. The interframe predictive coded picture input after the first intraframe predictive coded picture is acquired from the series of frames (step S407). The second block is extracted from the interframe predictive coded picture acquired (step S408).

Using the DCT coefficient of the second block extracted at step S408, the DCT coefficient of the first block determined to be the telop region is updated (step S409). Thereafter, when the next frame is an interframe predictive coded picture (step S410: YES), the procedure goes to step S407.

When the next frame is not an interframe predictive coded picture (step S410: NO), the second intraframe predictive coded picture is acquired (step S411). The third block is extracted from the second intraframe predictive coded picture acquired (step S412).

By weighting the DCT coefficient updated by the updating unit 109 using a weighting matrix, the second evaluation value that indicates the possibility that a telop is included in the third block extracted at step S412 is calculated (step S413). When the second evaluation value calculated is equal to or larger than a predetermined second threshold value (step S414: YES), the third block is determined to be the telop region same as the telop region determined at step S405 (step S415).

When the second evaluation value is not equal to or larger than the predetermined second threshold value (step S414: NO), the block is determined not to be a telop region same as the telop region determined at step S405 (step S416). Thereby, a discontinuing point between telops can be detected when another telop is present continuously in the same position.

Second Embodiment (Functional Configuration of Telop Detecting Device)

Description will be given for a second embodiment. In the second embodiment, in addition to the evaluation of the DCT coefficients shown in the first embodiment, telop detection is executed using motion vectors. More specifically, in a region that displays a telop in an image, the shape of the telop does not vary over time and the telop is kept displayed spatially integrated. Therefore, in a macro block in the telop region, motion compensation is executed by uniform motion vectors including the case where the length of each of the motion vectors is "zero".

For example, when the telop stays still, the motion compensation of the macro block including the telop is not executed (the motion vector is "zero") while, when the telop is moving, the motion vectors of the macro block in the display region thereof are also uniformly reflect the direction and the velocity of the motion of the telop. Utilizing this, in the second embodiment, the evaluation of the possibility of including a telop is executed from the motion vectors concerning the surroundings of the macro block in the image.

Figure 5:
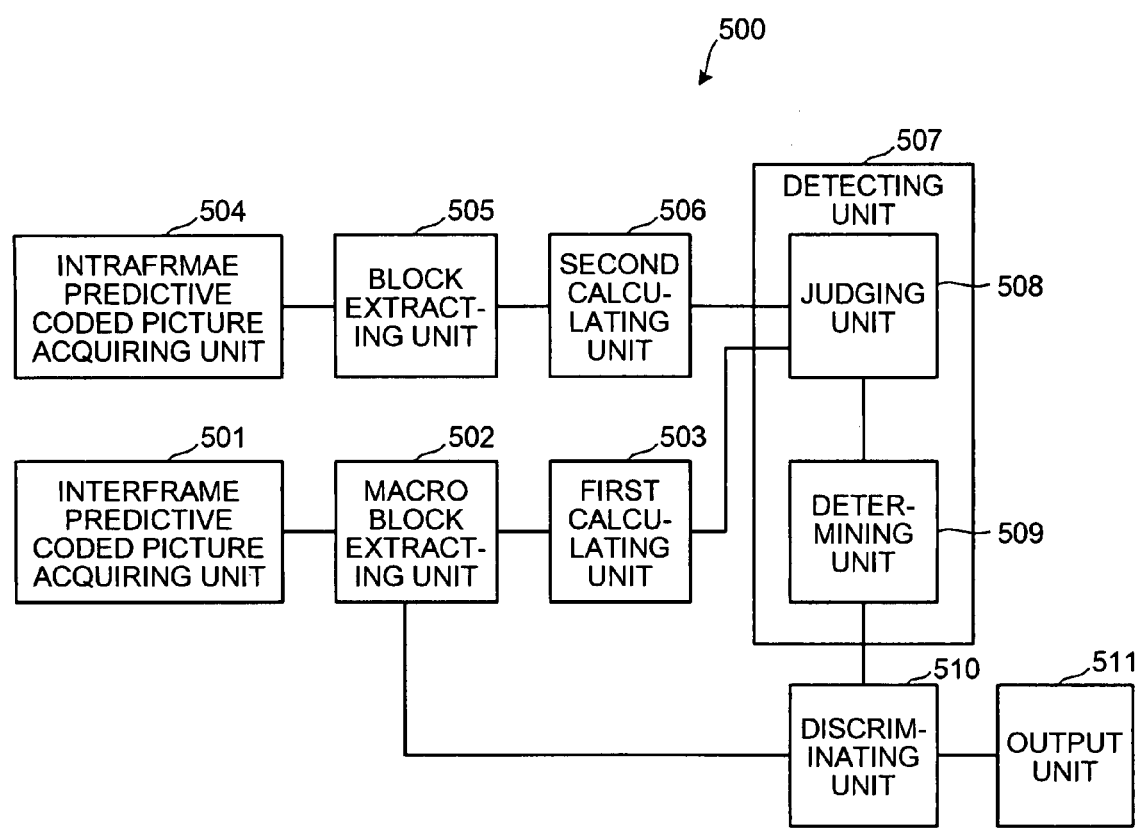
FIG. 5 is a block diagram of a functional configuration of a telop detecting device according to a second embodiment.

Description will be given for a functional configuration of a telop detecting device according to the second embodiment. FIG. 5 is a block diagram of a functional configuration of the telop detecting device according to the second embodiment. As shown in FIG. 5, a telop detecting device 500 includes an interframe predictive coded picture acquiring unit 501, a macro block extracting unit 502, a first calculating unit 503, an intraframe predictive coded picture acquiring unit 504, a block extracting unit 505, a second calculating unit 506, a detecting unit 507, a discriminating unit 510, and an output unit 511.

The interframe predictive coded picture acquiring unit 501 acquires an interframe predictive coded picture from a series of frames of a moving image compressed-encoded using orthogonal transformation from a space region to a frequency region, and the between-frame correlation. The series of frames concerning the moving image is, for example, a series of frame images compressed-encoded in the MPEG format, and includes intraframe predictive coded frames (intraframe predictive coded pictures) and interframe predictive coded frames (interframe predictive coded pictures).

The macro block extracting unit 502 extracts an arbitrary macro block to be focused (hereinafter, "notable macro block") and at least any one macro block of macro blocks present surrounding the notable macro block (hereinafter, "surrounding macro block"), from the interframe predictive coded picture acquired by the interframe predictive coded picture acquiring unit 501. The "macro block" is a unit region for executing interframe prediction using the above interframe correlation and includes parameters indicating the encoding method of the macro block thereof and motion vectors used for the motion compensation. More specifically, a macro block includes six blocks of four Y signals, a Cr signal, and a Cb signal. A surrounding blocks may be eight macro blocks surrounding the notable macro block or may be four macro blocks adjacent to and on and beneath and to the left and right of each other. At least one of the surrounding blocks may be extracted.

The first calculating unit 503 calculates a evaluation value (hereinafter, "first evaluation value" in the second embodiment) indicating the possibility that a telop is included in the notable macro block based on a motion vector of the notable macro block extracted by the macro block extracting unit 502 and a motion vector of the surrounding macro block extracted by the macro block extracting unit 502. The first evaluation value can be calculated based on the difference between the motion vector of the notable macro block and the motion vector of the surrounding macro block.

For example, the first evaluation value may be the number of times the difference between the motion vectors being "zero" or may be the total value of the differences. The calculation of the difference between the motion vectors will be described later. In addition to the difference between the motion vectors and the total value of the differences, the degree of motion compensation may be calculated from the motion vector length and the motion vector code length.

The intraframe predictive coded picture acquiring unit 504 shown in FIG. 5 acquires an intraframe predictive coded picture input after an interframe predictive coded picture from the series of frames. The block extracting unit 505 extracts a block in a macro block corresponding to an appearing position of the notable macro block from the in-frame estimated encoded image. As to the description for the block extracted is same as that of the above first embodiment, and therefore, is omitted.

The second calculating unit 506 calculates an evaluation value (hereinafter, "second evaluation value" in the second embodiment) that indicates the possibility that a telop is included in the block, by weighting the DCT coefficient in the block extracted by the block extracting unit 305 using a weighting matrix. The calculation of the weighting matrix and the calculation of the second evaluation value are same as those in the first embodiment, and therefore, are omitted.

The detecting unit 507 detects a telop region that includes a telop based on the first evaluation value and the second evaluation value calculated respectively by the first calculating unit 503 and the second calculating unit 505. That is, a telop region is detected that is present in each frame from the interframe predictive coded picture to the intraframe predictive coded picture.

More specifically, the detecting unit 507 includes a judging unit 508 and a determining unit 509. The judging unit 508 judges whether the first evaluation value is equal to or larger than a predetermined first threshold value, and based on this judgment result of the first evaluation value, also judges whether the second evaluation value is equal to or larger than a predetermined second threshold value.

The determining unit 509 determines the notable block to be a telop region based on the judgment results of the first evaluation value and the second evaluation value judged by the judging unit 508. Candidate telop regions can be narrowed from the notable macro blocks by the judging unit 508. A telop region can be detected from the notable macro blocks that are listed as the candidate telop regions. Thereby, the telop region of telops that appear continuously between frames can be detected.

The discriminating unit 510 discriminates whether the telop in the telop region detected by the detecting unit 507 is a stationary telop or a roll telop based on the motion vector of the notable macro block extracted by the macro block extracting unit 502 and the motion vector of the surrounding macro blocks extracted by the macro block extracting unit 502. More specifically, the discrimination is executed using the direction and the vector length of the motion vectors in the telop region. A specific exemplary discrimination will be described later. The output unit 511 outputs the discrimination result discriminated by the discriminating unit 510.

(Procedure of Telop Detecting Process)

Figure 6:
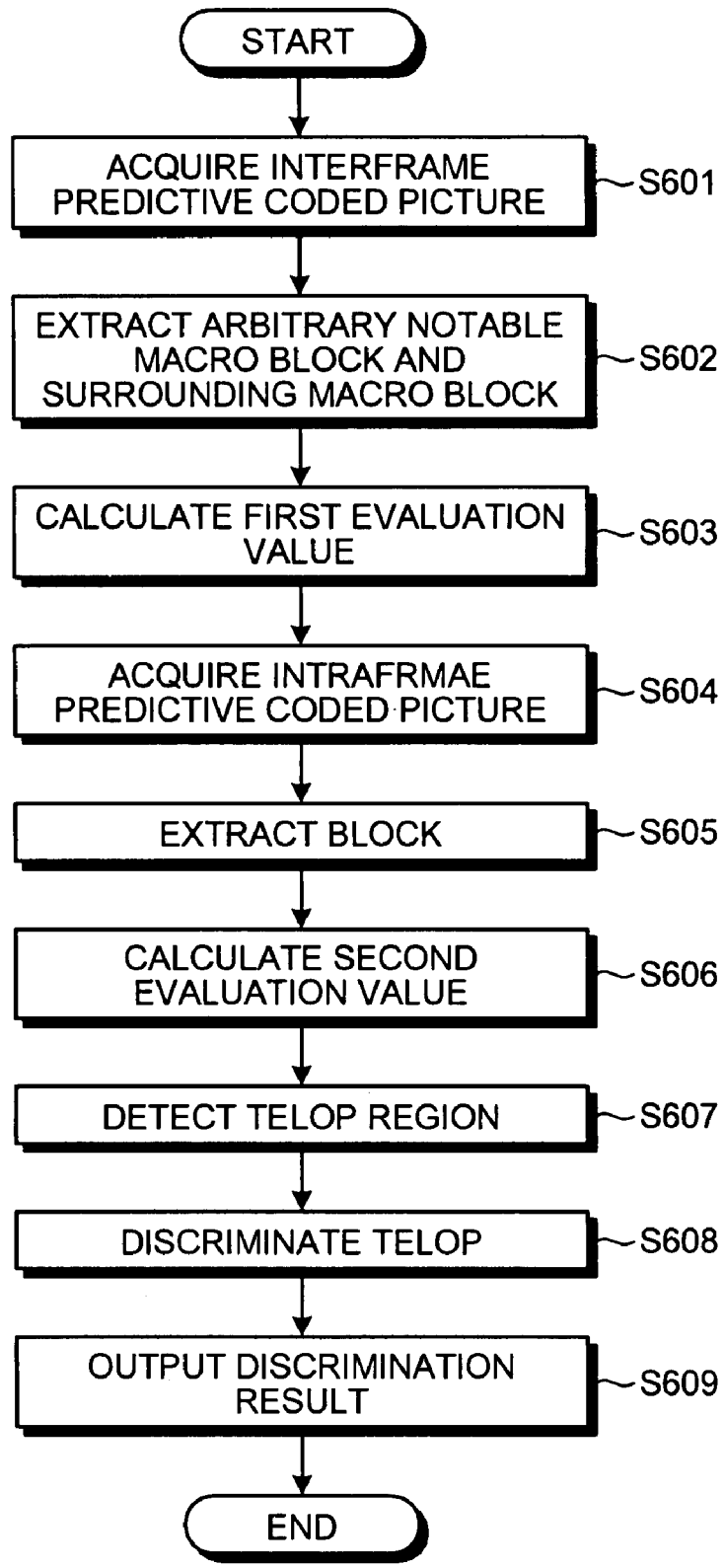
FIG. 6 is a flowchart of a telop detecting process according to the second embodiment.

Description will be given for a procedure of a telop detecting process according to the second embodiment. FIG. 6 is a flowchart of a telop detecting process according to the second embodiment. As shown in FIG. 6, an interframe predictive coded picture is acquired from a series of frames (step S601). From the interframe predictive coded picture, an arbitrary notable macro block and macro blocks surround the arbitrary notable macro block are extracted (step S602).

Based on the motion vector of the notable macro block and the motion vectors of the surrounding macro blocks, a first evaluation value indicating the possibility that a telop is included in the notable macro block is calculated (step S603). Thereafter, an intraframe predictive coded picture input after the interframe predictive coded picture is acquired (step S604). A block is extracted from the interframe predictive coded picture acquired (step S605).

Using a weighting matrix, the second evaluation value that indicates the possibility that a telop is included in the block is calculated by weighting the DCT coefficient in the block extracted at step S605 (step S606). A telop region including a telop is detected based on the first evaluation value calculated at step S603 and the second evaluation value calculated at step S606 (step S607).

Whether the telop in the telop region detected by the detecting unit 507 is a stationary telop or a roll telop is discriminated based on the motion vector of the notable macro block extracted by the macro block extracting unit 502 and the motion vector of the surrounding macro blocks extracted by the macro block extracting unit 502 (step S608). The discrimination result is output (step S609).

According to the second embodiment, a stationary telop and a roll telop can be detected without discriminating those telops from each other because the motion vector difference is used. The discriminating unit 510 can also discriminate whether a stationary telop or a roll telop for a telop in a telop region detected without discriminating the type of the telop.

First Example

Description will be given for a first example of a telop detecting device. The telop detecting device according to the first example is an example of the telop detecting device according to the above first embodiment.

(Hardware Configuration of Telop Detecting Device)

Figure 7:
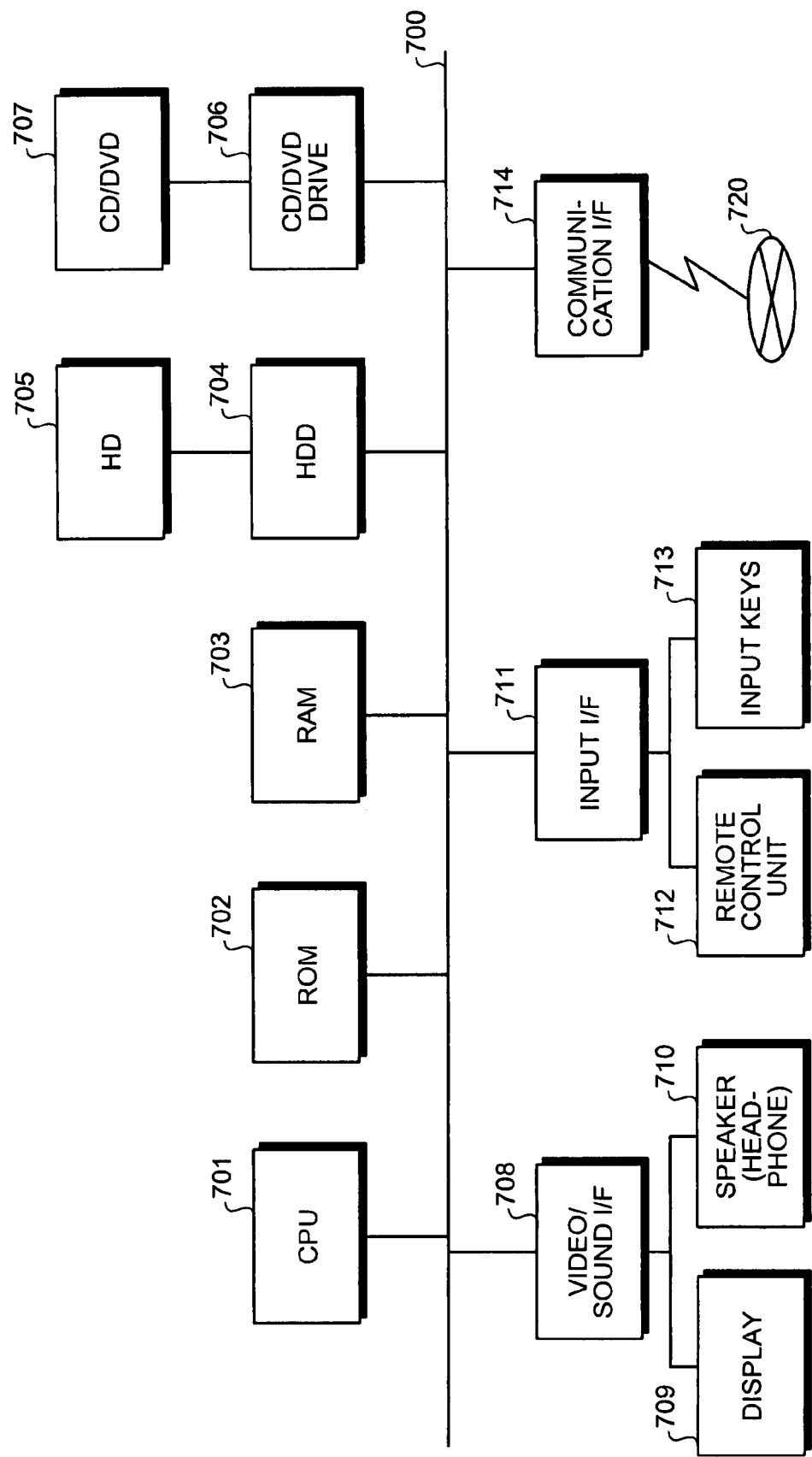
FIG. 7 is a block diagram of a hardware configuration of the telop detecting device according to a first example.

Description will be given for the hardware configuration of the telop detecting device according to the first example. FIG. 7 is a block diagram of a hardware configuration of the telop detecting device according to the first example. As shown in FIG. 7, the telop detecting device includes a CPU 701, a ROM 702, a RAM 703, an HDD (Hard Disk Drive) 704, an HD (Hard Disk) 705, a CD/DVD drive 706, a CD/DVD 707 as an example of a detachable recording medium, a video/audio I/F (interface) 708, a display 709, a speaker 710, an input I/F (interface) 711, a remote control unit 712, input keys (including a keyboard or a mouse) 713, and a communication I/F (interface) 714. The above components 701 to 714 are respectively connected by a bus 700 to each other.

The CPU 701 administers the control of the entire telop detecting device. The ROM 702 stores programs such as a boot program. The RAM 703 is used by the CPU 701 as a work area. The HDD 704 controls reading/writing of data from/to the HD 705 according to the control of the CPU 701. The HD 705 stores data written according to the control of the HDD 704.

The CD/DVD drive 706 controls reading/writing of data from/to the CD/DVD 707 according to the control of the CPU 701. The CD/DVD 707 is a detachable recording medium from which data recorded according to the control of the CD/DVD drive 706 is read. A writable recording medium can be used as the CD/DVD 707. As a detachable recording medium, in addition to the CD/DVD 707, a CD-ROM (CD-R, CD-RW), an MO, or a memory card may be used.

The video/audio I/F 708 is connected to the display 709 for video display and the speaker 710 for audio output. In addition to a cursor, icons, menus, windows, or tool boxes, the display 709 displays various types of data such as characters, videos, etc. A CRT, a TFT liquid crystal display, or a plasma display, for example, may be employed as the display 709. Sound is output from the speaker 710.

The input I/F 711 inputs data transmitted from the remote control unit 712 or the input keys 713 that include a plurality of keys to input characters, numerals, various instructions, etc. The input keys 713 include keys to input characters, numerals, various instructions, etc., and input data according to operations of a user.

The communication I/F 714 is connected to a network 720 by wireless or through a communication line and is connected to other apparatuses through the network 720. In addition to the Internet, the network 720 may be a LAN, a WAN, a public line network, a portable telephone network, or a television broadcasting network such as television broadcasting stations. The communication I/F 714 administers the interface between the network 720 and the CPU 701 and controls transmission and reception of data to/from external apparatuses. The communication I/F 714 includes a tuner, and can select television stations and receive video contents.

(Functional Configuration of Telop Detecting Device)

Figure 8:
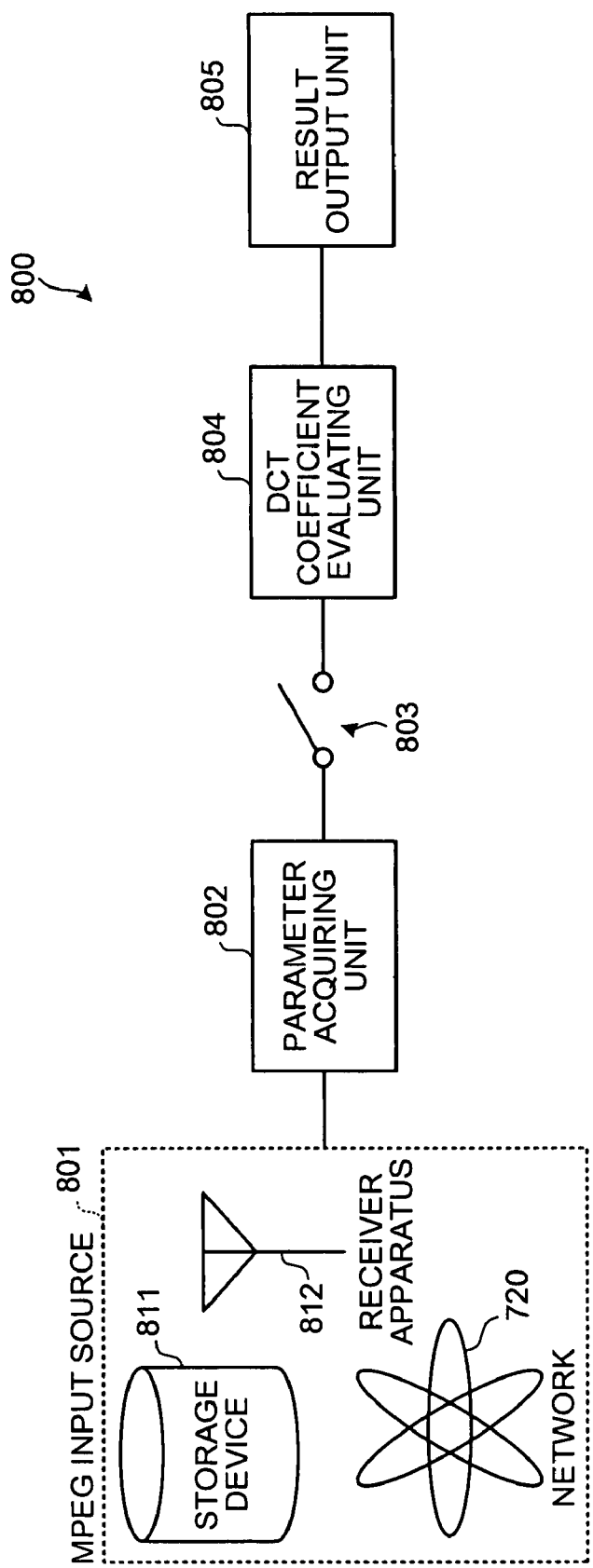
FIG. 8 is a block diagram of a functional configuration of the telop detecting device according to the first example.

Description will be given for a functional configuration of the telop detecting device according to the first example. FIG. 8 is a block diagram of the functional configuration of the telop detecting device according to the first example. As shown in FIG. 8, a telop detecting device 800 includes an MPEC input source 801, a parameter acquiring unit 802, a switch 803, a DCT coefficient evaluating unit 804, and a result output unit 805.

The MPEC input source 801 is a medium to acquire an MPEG stream. An MPEG stream includes a series of frames concerning a moving image compressed in the MPEG compressing encoding format such as, for example, video contents.

The series of frames includes a frame that is intraframe prediction coded (hereinafter, "intraframe predictive coded picture") and a frame that is interframe prediction coded (hereinafter, "interframe predictive coded picture"). Each frame consists of a plurality of macro blocks and each of the macro blocks is compressed-encoded.

The MPEG input source 801 may be any medium that can acquire an MPEG stream such as the HD 705, an optical disk such as the CD/DVD 707, a storage device 811 that stores data in advance such as a flash memory, the network such as the IP or the IEEE 1394, and a receiver apparatus 812, etc., for broadcasting, shown in FIG. 7.

The parameter acquiring unit 802 interprets an MPEG stream input from the MPEG input source 801, extracts an intraframe predictive coded picture from the MPEG stream, and acquires parameters necessary for detecting a telop.

Parameters are information on the image type of the frame extracted and the DCT coefficient of each block. The information on the image type of the frame is information indicating whether the frame extracted is an intraframe predictive coded picture or an interframe predictive coded picture, and is attached to the header of each frame.

The parameter acquiring unit 802 corresponds to the intraframe predictive coded picture acquiring unit 101 shown in FIG. 1, and more specifically, realizes the function thereof, for example, by the CPU 701 executing a program stored in a recording medium such as the ROM 702, the RAM 703, the HD 705, and the CD/DVD 707 shown in FIG. 7, or by the communication I/F 714.

The switch 803 turns on and outputs to the DCT coefficient evaluating unit 804 the DCT coefficient retained by a block in the intraframe predictive coded picture when the frame acquired by the parameter acquiring unit 802 is intraframe prediction coded. When the frame acquired is interframe prediction coded, the switch 803 turns off and cancels the connection with the DCT coefficient evaluating unit 804. More specifically, the switch 803 turns on or off by referring to the information of the image type attached to the header of each frame.

The switch 803 corresponds to the intraframe predictive coded picture acquiring unit 101 and the first extracting unit 102 shown in FIG. 1, and more specifically, realizes the function thereof by, for example, the CPU 701 executing a program stored in a recording medium such as the ROM 702, the RAM 703, the HD 705, and the CD/DVD 707 shown in FIG. 7.

The DCT coefficient evaluating unit 804 evaluates the possibility that a telop is included from the DCT coefficient of each block in the frame acquired through the switch 803, and judges and outputs a telop region. More specifically, the DCT coefficient evaluating unit 804 weights the DCT coefficient of each block using a weighting matrix W and calculates evaluation values.

That is, M×N DCT coefficients constituting each block are represented as a matrix C and each element thereof is represented as Cij (1≦i, j≦8). Cij is the DCT coefficient in i-th line and in j-th column of the matrix C. The weighting matrix W is also an eight by eight matrix corresponding to a block and each element thereof is represented as Wij (1≦i, j≦8). Wij is a weighting parameter in i-th line and in j-th column of the weighting matrix W.

As expressed in the following Equation (1), after weighting the absolute value |Cij| of the DCT coefficient Cij by multiplying the absolute value |Cij| by the weighting parameter Wij of the weighting matrix W, the total value is calculated. This total value is an evaluation value v. The evaluation value v corresponds to the first evaluation value in the above first embodiment.

[Equation 1]

$$v = \sum_{i,j=1}^{8} |C_{ij}| W_{ij} \qquad (1)$$

Description will be given in detail for the weighting matrix W. As above, the weighting matrix W is a matrix for which, compared to a value that weights a DCT coefficient of an arbitrary frequency band in a block, a value is higher that weights a DCT coefficient of another frequency band including frequencies that are higher than those of the arbitrary frequency band. That is, the weighting matrix W is a matrix with which the weighting parameter becomes larger for the DCT coefficient of a higher frequency component in the DCT coefficients of an AC component in a block. An example of the weighting matrix W will be listed.

[Equation 2]

$$W = \begin{pmatrix} 0 & 1 & 1 & 1 & 1 & 2 & 4 & 8 \\ 1 & 1 & 1 & 1 & 1 & 2 & 4 & 8 \\ 1 & 1 & 1 & 1 & 1 & 2 & 4 & 8 \\ 1 & 1 & 1 & 1 & 1 & 2 & 4 & 8 \\ 1 & 1 & 1 & 1 & 1 & 2 & 4 & 8 \\ 2 & 2 & 2 & 2 & 2 & 2 & 4 & 8 \\ 4 & 4 & 4 & 4 & 4 & 4 & 4 & 8 \\ 8 & 8 & 8 & 8 & 8 & 8 & 8 & 8 \end{pmatrix} \qquad (2)$$

Each weighting parameter Wij of the weighting matrix W of the Equation (2) corresponds to the DCT coefficient of a block. That is, the weighting parameter W11 that corresponds to the DCT coefficient C11 is "zero". The weighting parameters Wij (i, j≠1) corresponding to the DCT coefficients Cij (i, j≠1) of the AC component are "1", "2", "4", and "8" in order of increasing frequency of the AC component.

The weighting matrix W of Equation (2) is an example and does not limit the matrix to be used for weighting. However, to evaluate by causing large values to appear in the high-frequency component, the matrix is configured to have a larger weighting parameter Wij for the DCT coefficient Cij (i, j≠1) of a DCT higher-frequency component. Another weighting matrix W may be considered to be, for example, a matrix of the following Equation (3).

[Equation 3]

$$W = \begin{pmatrix} 0 & 1 & 1 & 1 & 1 & 2 & 3 & 5 \\ 1 & 1 & 1 & 1 & 1 & 2 & 3 & 5 \\ 1 & 1 & 1 & 1 & 1 & 2 & 3 & 5 \\ 1 & 1 & 1 & 1 & 1 & 3 & 5 & 8 \\ 1 & 1 & 1 & 1 & 2 & 3 & 5 & 8 \\ 2 & 2 & 2 & 3 & 3 & 5 & 8 & 8 \\ 3 & 3 & 3 & 5 & 5 & 8 & 8 & 8 \\ 5 & 5 & 5 & 8 & 8 & 8 & 8 & 8 \end{pmatrix} \qquad (3)$$

The DCT coefficient evaluating unit 804 judges whether the evaluation value v calculated is equal to or larger than a threshold value Vth. Based on the judgment result, whether the block is a telop region including a telop is determined. Thereby, the telop region can be detected. This telop region detection result is output for input to another apparatus or a program that uses the telop region detection result, storage in a memory or a storage device, transmission through a network, and a user interface such as a screen.

The DCT coefficient evaluating unit 804 corresponds to the calculating unit 103 and the detecting unit 104 shown in FIG. 1, and more specifically, realizes the function thereof by, for example, executing by the CPU 701 of the program stored in a recording medium such as the ROM 702, the RAM 703, the HD 705, and the CD/DVD 707 shown in FIG. 7.

The result output unit 805 outputs the telop detection evaluation result in the form of a binary matrix for each block for one frame every time an intraframe predictive coded picture is processed. For example, when the image resolution is 720×480 pixels, a matrix of the size 90×60 is output because a block has a size of eight dots×eight dots. The value of each of the matrixes is "one" when, for example, a telop region is judged in the DCT coefficient evaluation and is "zero" when a non-telop region is judged. When color difference information is used, each color difference signal block of 16 dots×16 dots may be output.

The result output unit 805 corresponds to the detecting unit 104 shown in FIG. 1, and more specifically, realizes the function thereof by, for example, executing by the CPU 701 of the program stored in a recording medium such as the ROM 702, the RAM 703, the HD 705, and the CD/DVD 707 or by the communication I/F 714 shown in FIG. 7.

(Procedure of Telop Detecting Process)

Figure 9:
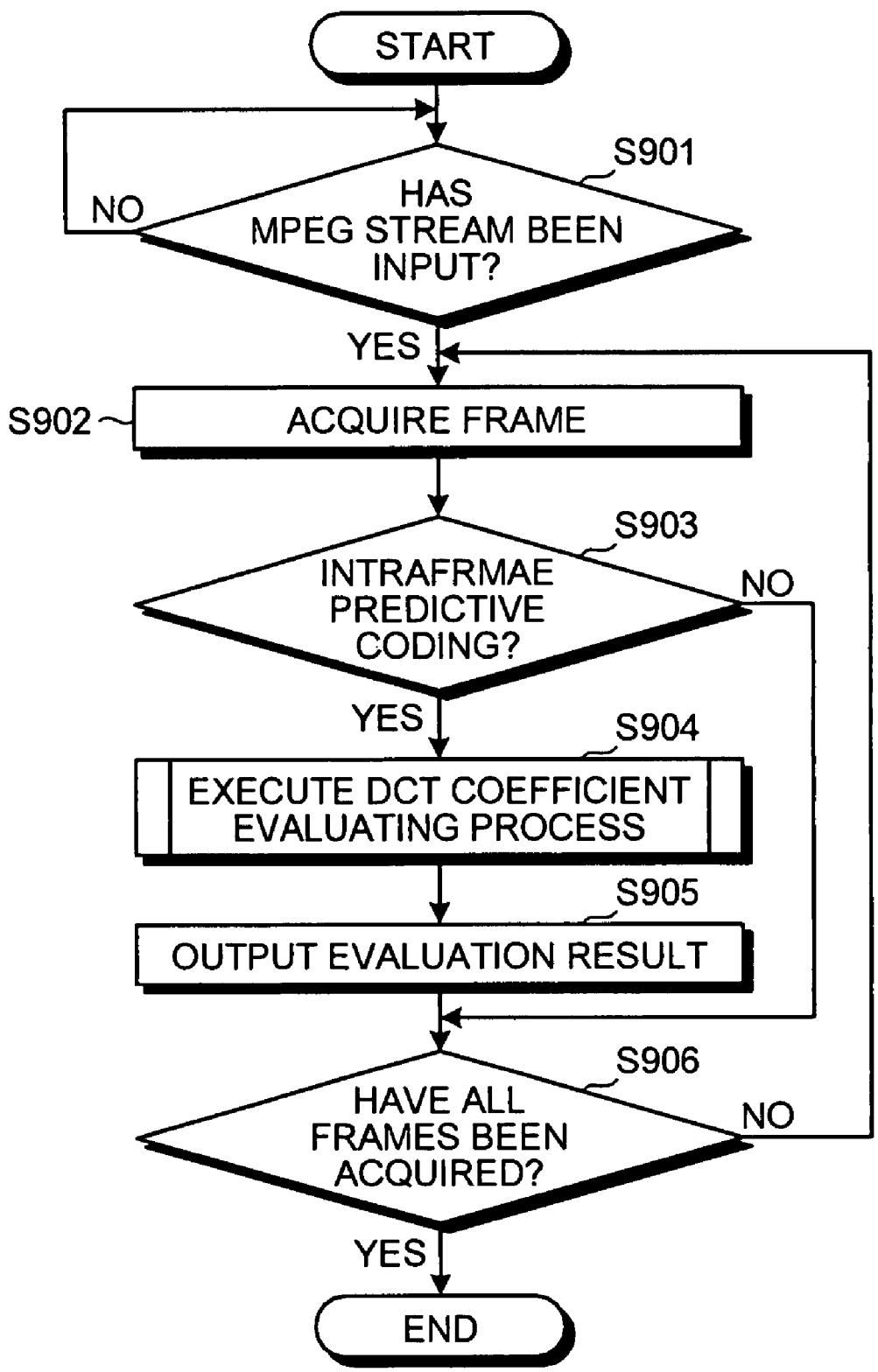
FIG. 9 is a flowchart of a telop detecting process according to the first example.

Description will be given for a procedure of a telop detecting process according to the first example. FIG. 9 is a flowchart of the telop detecting process according to the first example. As shown in FIG. 9, when an MPEG stream is input (step S901: YES), a frame at the head is acquired from the MPEG stream (step S902).

The image type of the frame acquired is identified from information on the image type of the frame acquired (step S903). In this case, when the image type of the frame acquired is between-frame estimation encoding (step S903: NO), the switch 803 is turned off and the procedure moves to step S906.

When the image type of the frame acquired is in-frame estimation encoded (step S903: YES), the switch 803 is turned on and a DCT coefficient evaluating process is executed (step S904). Thereafter, the evaluation result of the DCT coefficient evaluating process is output (step S905).

When all of the frames are not yet acquired (step S906: NO), the procedure goes to step S902 and the next frame is acquired. When all of the frames are acquired (step S906: YES), the series of process steps are finished.

Figure 10:
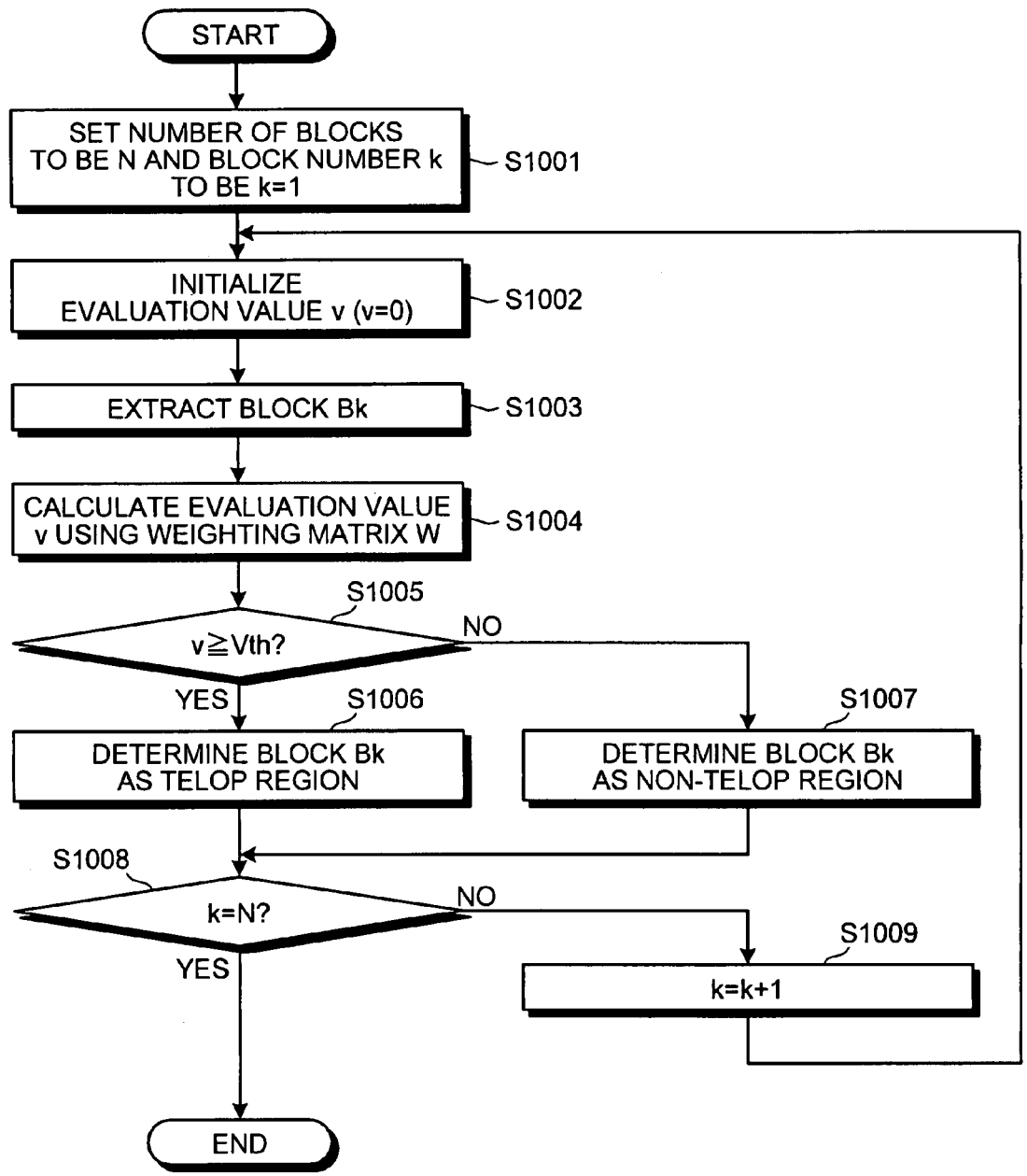
FIG. 10 is a flowchart of a DCT coefficient evaluating process.

Description will be given in detail for the DCT coefficient evaluating process procedure at step S904. FIG. 10 is a flowchart of the DCT coefficient evaluating process. In FIG. 10, the frames acquired are scanned and the number of blocks is N and the block number k is k=1 (step S1001). The evaluation value v is initialized (v=0) (step S1002) and a block Bk is extracted (step S1003).

Using Equation (1), the evaluation value v is calculated by multiplying the absolute value $|Cij|$ of each DCT coefficient Cij of the extracted block Bk by the weighting parameter Wij in the same position as that of the DCT coefficient Cij (step S1004). Whether the evaluation value v is equal to or larger than the threshold value Vth is judged (step S1005).

When the evaluation value v is equal to or larger than the threshold value Vth (step S1005: YES), the block Bk is determined as a telop region including a telop (step S1006). When the evaluation value v is not equal to or larger than the threshold value Vth (step S1005: NO), the block Bk is determined as a non-telop region that does not include a telop (step S1007).

Thereafter, when k is not k=N (step S1008: NO), k is incremented (step S1009) and the procedure moves to step S1002. When k is k=N (step S1008: YES), the DCT coefficient evaluating process is finished.

Figure 11:
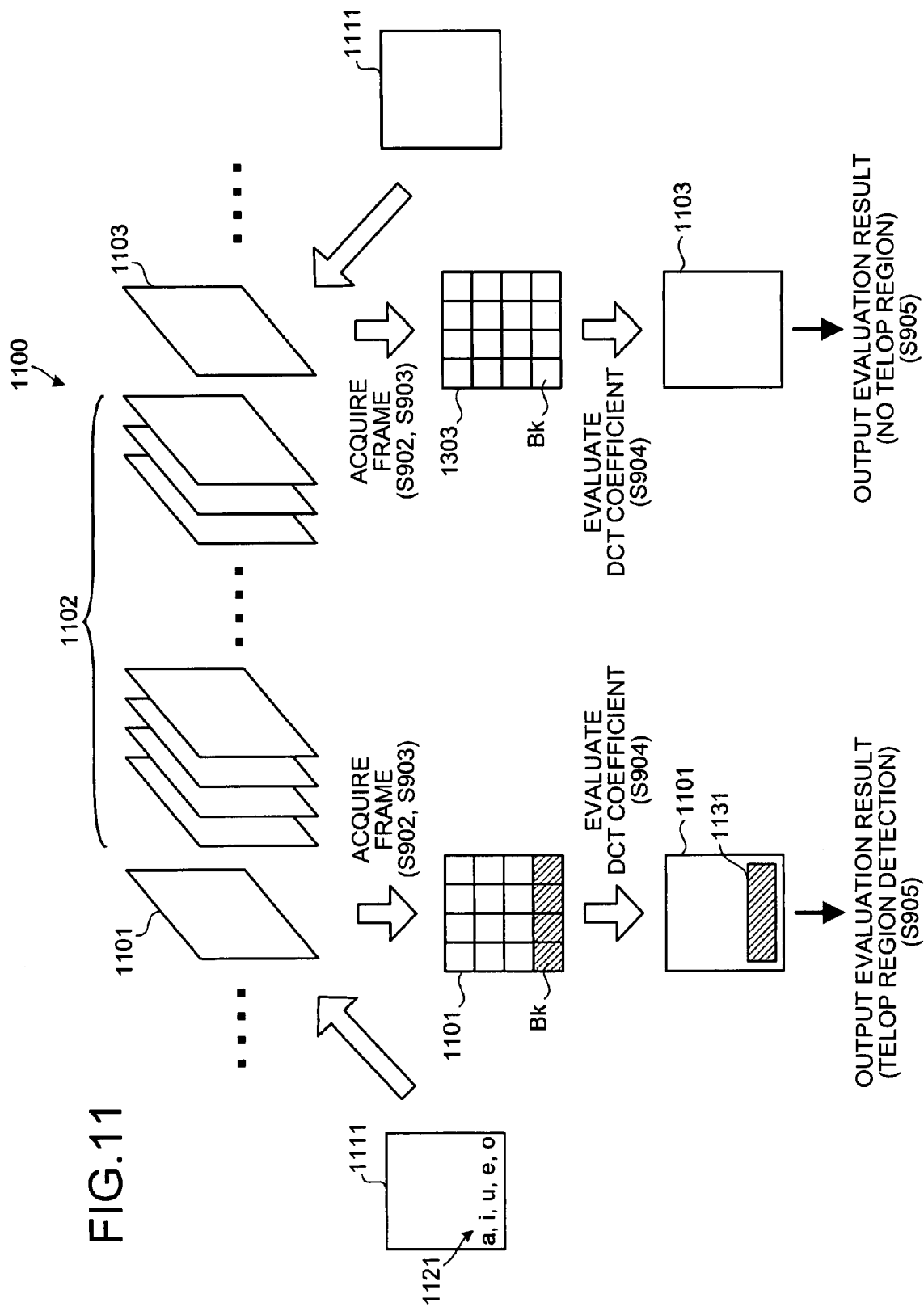
FIG. 11 is a schematic view of a telop detecting process.

Description will be given schematically for the above telop detecting process. FIG. 11 is a schematic view of a telop detecting process. In FIG. 11, steps corresponding to those in FIG. 9 are given the corresponding step numbers shown in FIG. 9.

In FIG. 11, an MPEG stream 1100 is a series of frames of a moving image compressed according to the MPEG compressing-encoding format, and is constituted of intraframe predictive coded pictures 1101 and 1103, and an interframe predictive coded picture 1102. The MPEG steam 1100 is input from the MPEG input source 801.

Assuming that a restored image 1111 of the intraframe predictive coded picture 1101 includes a telop 1121 ("a, i, u, e, o"), the evaluation value v of the block Bk (shaded block in FIG. 11) corresponding to the appearing position of a telop 1121 of the block Bk of the frame 1101 acquired from the MPEG steam 1100 is equal to or larger than the threshold value Vth and a telop region 1131 can be detected from the frame 1101.

Assuming that the restored image 1111 of the frame 1103 includes no telop, all the evaluation value v of the block Bk of the intraframe predictive coded picture 1103 acquired from the MPEG steam 1100 are not equal to or larger than the threshold value Vth and no telop region is detected from the intraframe predictive coded picture 1103.

In this manner, according to the above first example, at the time when an intraframe predictive coded picture appears, a telop region can be detected using only the DCT coefficient of a block of the frame. In other words, without using an interframe predictive coded picture, the fact that an edge that is a feature of a telop appears (in a high-frequency component in the DCT coefficient of the AC component) as a feature of a frequency band is used.

Therefore, a telop region and a non-telop region can be separated from each other with higher precision and improvement of the telop detection precision can be facilitated. Therefore, it is possible to prevented erroneous detection of a stationary region of an object other than a telop as a telop region.

According to the first example, because not the appearance of a telop but the fact that the telop is being displayed is detected, the telop can be traced as far as the telop is displayed and improvement of the detection precision can be facilitated. Therefore, the timing for detecting the telop is not limited to the time when the telop appears, and such a telop can be detected easily as the one that appears in a specific way such as fading in or sequential appearance of characters, a telop that appears simultaneously with the change of scenes, or a small telop.

According to the first example, because a steep edge is detected by weighting a high-frequency component of the DCT coefficient of the AC component of a block, a telop region can be detected with higher precision. Therefore, a non-telop region including no telop and with considerably varying brightness and color difference, and a telop region including a telop can be easily distinguished from each other and the telop region can be easily detected.

In the above first example, the DCT coefficient evaluating process is not limited to the above method. For example, the evaluation value v may be calculated by extracting the maximal value $MAX\{|Cij|Wij\}$ of values $|Cij|Wij$ obtained by weighting the absolute values $|Cij|$ of the DCT coefficients Cij by the weighting parameter Wij for each frequency band of the block Bk and summing the representative value $MAX\{|Cij|Wij\}$ extracted of each frequency band.

More specifically, for example, a weighting matrix W as expressed by the following Equation (4) is prepared, and such that in the weighting matrix W, a weighting parameter Wij in the same position as the value of the weighting parameter Wij is regarded as one frequency band individually, the DCT coefficients of the block Bk are divided such that the coefficients correspond to the frequency bands.

[Equation 4]

$$W = \begin{pmatrix} 0 & 1 & 2 & 3 & 4 & 5 & 6 & 7 \\ 1 & 1 & 2 & 3 & 4 & 5 & 6 & 7 \\ 2 & 2 & 3 & 4 & 4 & 5 & 6 & 7 \\ 3 & 3 & 4 & 4 & 5 & 6 & 7 & 8 \\ 4 & 4 & 4 & 5 & 6 & 6 & 7 & 8 \\ 5 & 5 & 5 & 6 & 6 & 7 & 8 & 9 \\ 6 & 6 & 6 & 7 & 7 & 8 & 9 & 9 \\ 7 & 7 & 7 & 8 & 8 & 9 & 9 & 10 \end{pmatrix} \quad (4)$$

In each frequency band in the block Bk, the value $MAX\{|Cij|Wij\}$ obtained by multiplying the maximal value of the absolute value $MAX\{|Cij|\}$ of the DCT coefficient Cij by the weighting parameter Wij of the same frequency band of the weighting matrix W of the above Equation (4) is the representative value of the frequency band. A value obtained by totaling the representative values of all the frequency bands is the evaluation value that represents the possibility of including a telop of the block Bk. According to this evaluating approach, the same effect as above effect can also be obtained.

Second Example

Description will be given for a telop detecting device according to a second example next. The telop detecting device according to the second example is an example of the telop detecting device 100 according to the above first embodiment. The telop detecting device according to the second example is a telop detecting device that can detect discontinuity between telops that are in the same position between sequential frames. Because the hardware configuration of the telop detecting device according to the second example is same as the hardware configuration of the telop detecting device 800 according to the first embodiment shown in FIG. 7, the description thereof is omitted.

(Functional Configuration of Telop Detecting Device)

Figure 12:
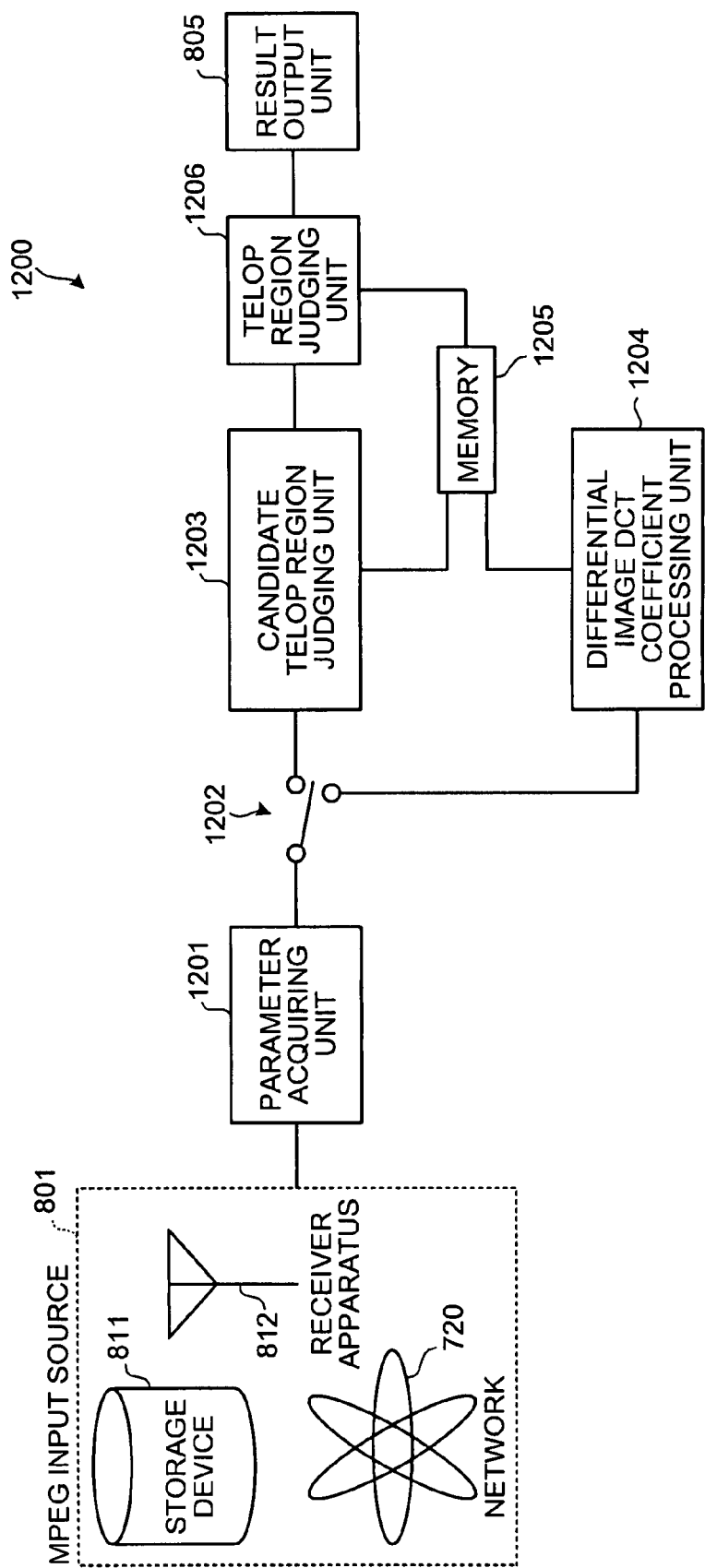
FIG. 12 is a block diagram of a functional configuration of the telop detecting device according to a second example.

Description will be given for a functional configuration of the telop detecting device according to the second example. FIG. 12 is a block diagram of the functional configuration of the telop detecting device according to the second example. The components same as the components of the first example shown in FIG. 8 are given the same reference numerals and the description thereof is omitted.

A shown in FIG. 12, a telop detecting device 1200 includes the MPEG input source 801, the result output unit 805, a parameter acquiring unit 1201, a switch 1202, a candidate telop region judging unit 1203, a differential image DCT coefficient processing unit 1204, a memory 1205, and a telop region judging unit 1206.

The parameter acquiring unit 1201 interprets an MPEG stream input from the MPEG input source 801, extracts an intraframe predictive coded picture and an interframe predictive coded picture from the MPEG stream, and acquires parameters necessary for detecting a telop. Similarly to the first example, parameters are information on the image type of the frames extracted and the DCT coefficient of each block. The information on the image type of the frame is information indicating whether the frame extracted is an intraframe predictive coded picture or interframe predictive coded picture, and is attached to the header of each frame.

The parameter acquiring unit 1201 corresponds to the intraframe predictive coded picture acquiring unit 101 and the interframe predictive coded picture acquiring unit 107 shown in FIG. 1, and more specifically, realizes the function thereof, for example, by the CPU 701 executing a program stored in a recording medium such as the ROM 702, the RAM 703, the HD 705, and the CD/DVD 707 shown in FIG. 7, or by the communication I/F 714.

The switch 1202 connects to the candidate telop region judging unit 1203 and outputs a DCT coefficient of the intraframe predictive coded picture when the image type of the frame acquired by the parameter acquiring unit 1201 is the intraframe prediction coded type. When the image type of the frame acquired by the parameter acquiring unit 1201 is the interframe prediction coded type, the switch 1202 connects to the differential image DCT coefficient processing unit 1204 and outputs a DCT coefficient of the interframe predictive coded picture, that is, a differential image.

The switch 1202 corresponds to the intraframe predictive coded picture acquiring unit 101, the first extracting unit 102, the interframe predictive coded picture acquiring unit 107, and the second extracting unit 108 shown in FIG. 1, and more specifically, realizes the function thereof, for example, by executing by the CPU 701 of a program stored in a recording medium such as the ROM 702, the RAM 703, the HD 705, and the CD/DVD 707 shown in FIG. 7.

The candidate telop region judging unit 1203 judges from the DCT coefficient of a block in the intraframe predictive coded picture whether the block is a candidate telop region. More specifically, an evaluation value v1 is calculated using the above weighting matrix W. That is, the evaluation value V1 is calculated by multiplying the DCT coefficient Cij by the weighting parameter Wij of the weighting matrix W using the following Equation (5).

[Equation 5]

$$v1 = \sum_{i,j=1}^{8} |Cij|Wij \quad (5)$$

Whether the evaluation value v1 is equal to or larger than a predetermined threshold value V1th is judged. When the evaluation value v1 is equal to or larger than the threshold value V1th, the block is determined to be a candidate telop region, and when the evaluation value v1 is not equal to or larger than the threshold value V1th, the block is determined to be a non-telop region. The DCT coefficient Cij of the block that is a candidate telop region is output to a memory and is retained as a retained DCT coefficient Dij.

The candidate telop region judging unit 1203 corresponds to the calculating unit 103 and the detecting unit 104, and more specifically, realizes the function thereof, for example, by the CPU 701 executing a program stored in a recording medium such as the ROM 702, the RAM 703, the HD 705, and the CD/DVD 707 shown in FIG. 7.

The differential image DCT coefficient processing unit 1204 extracts the DCT coefficient Cij of a block in an interframe predictive coded picture (differential image) and updates the retained DCT coefficient Cij of the block in the previous intraframe predictive coded picture stored in the memory 1205.

More specifically, when the position of the block in the previous intraframe predictive coded picture stored in the memory 1205 and the position of the block in the interframe predictive coded picture (differential image) are the same, the absolute value |Cij| of the DCT coefficient Cij of the block in the interframe predictive coded picture (the differential image) is subtracted from the retained DCT coefficient Dij and the subtraction result is retained again in the memory as a new retained DCT coefficient Dij.

The differential image DCT coefficient processing unit 1204 corresponds to the updating unit 109 shown in FIG. 1, and more specifically, realizes the function thereof, for example, by the CPU 701 executing of a program stored in a recording medium such as the ROM 702, the RAM 703, the HD 705, and the CD/DVD 707 shown in FIG. 7.

The memory 1205 stores the retained DCT coefficient Dij. The memory 1205 corresponds to the updating unit 109 shown in FIG. 1, and more specifically, realizes the function thereof, for example, by a recording medium such as the ROM 702, the RAM 703, the HD 705, and the CD/DVD 707 shown in FIG. 7.

The telop region judging unit 1206 judges and outputs a telop region from the retained DCT coefficient Dij accumulated in the memory by a process for the intraframe predictive coded picture input immediately before and the interframe predictive coded picture input thereafter.

More specifically, the unit 1206 calculates the weighting parameter Wij of the weighting matrix W by multiplying the retained DCT coefficient Dij by the weighting parameter Wij of the weighting matrix W, and calculates an evaluation value v2 by totaling respective Dij·Wij. However, depending on the quantity of the DCT coefficients Cij generated in the differential image, the updated retained DCT coefficient Dij may be a negative number, and in that case, the value of Dij·Wij is regarded as "zero".

[Equation 6]

$$v2 = \sum_{i,j=1}^{8} C_{ij} W_{ij} \quad (6)$$

Whether the evaluation value v2 is equal to or larger than a predetermined threshold value V2*th* is judged. When the evaluation value v2 is equal to or larger than the threshold value V2*th*, this block is determined as a telop region. When the evaluation value v2 is not equal to or larger than the threshold value V2*th*, the block is determined as a non-telop region.

The telop region judging unit 1206 corresponds to the calculating unit 103 and the detecting unit 104 shown in FIG. 1, and more specifically, realizes the function thereof, for example, by a recording medium such as the ROM 702, the RAM 703, the HD 705, and the CD/DVD 707 shown in FIG. 7.

(Procedure of Telop Detecting Process)

Figure 13:
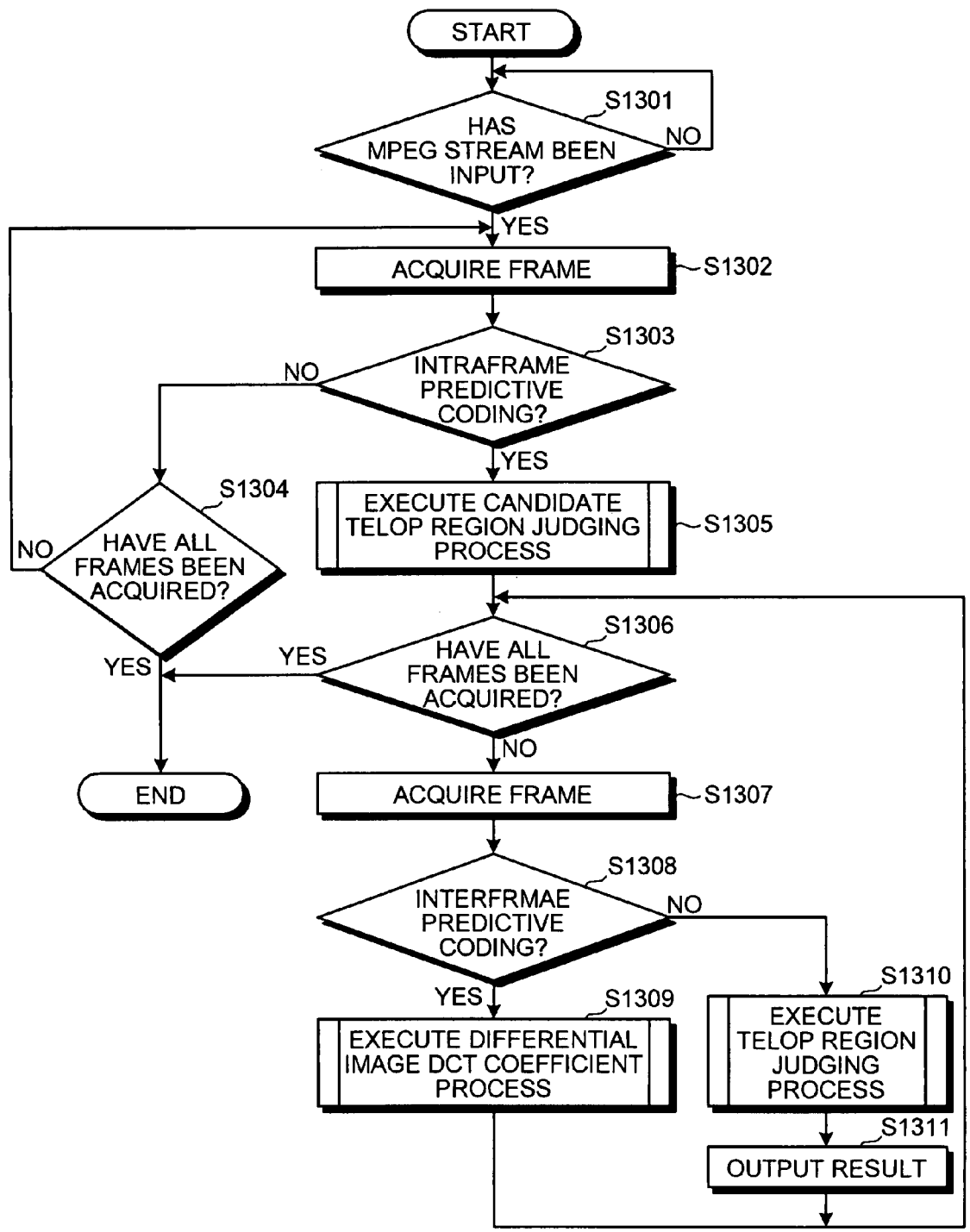
FIG. 13 is a flowchart of a telop detecting process according to the second example.

Description will be given to a procedure of a telop detecting process according to the second example. FIG. 13 is a flowchart of the telop detecting process according to the second example. When an MPEG stream is input (step S1301: YES), a frame at the head is acquired from the MPEG stream (step S1302).

The image type of the frame acquired is identified from information on the image type of the frame acquired (step S1303). In this case, when the image type of the frame acquired is between-frame estimation encoding (step S1303: NO), if all the frames have been acquired (step S1304: YES), the series of process steps are finished. If not all the frames have been acquired (step S1304: NO), the procedure moves to step S1302.

When the image type of the frame acquired at step S1302 is intraframe prediction coding at step 1303 (step S1303: YES), a candidate telop region judging process is executed (step S1305). When all the frames have been acquired (step S1306: YES), the series of process steps are finished.

When not all of the frames are acquired (step S1306: NO), the next frame is acquired (step S1307). When the image type of the frame acquired at step S1307 is the interframe prediction coding (step S1308: YES), a differential image DCT coefficient process is executed (step S1309). After executing the differential image DCT coefficient process, the procedure moves to step S1306.

When the image type of the frame acquired at step S1307 is the in-frame estimation encoding (step S1308: NO), the telop region judging process is executed (step S1310). The telop detection result for the frame acquired at step S1307 is output (step S1311) and the procedure goes to step S1306.

Figure 14:
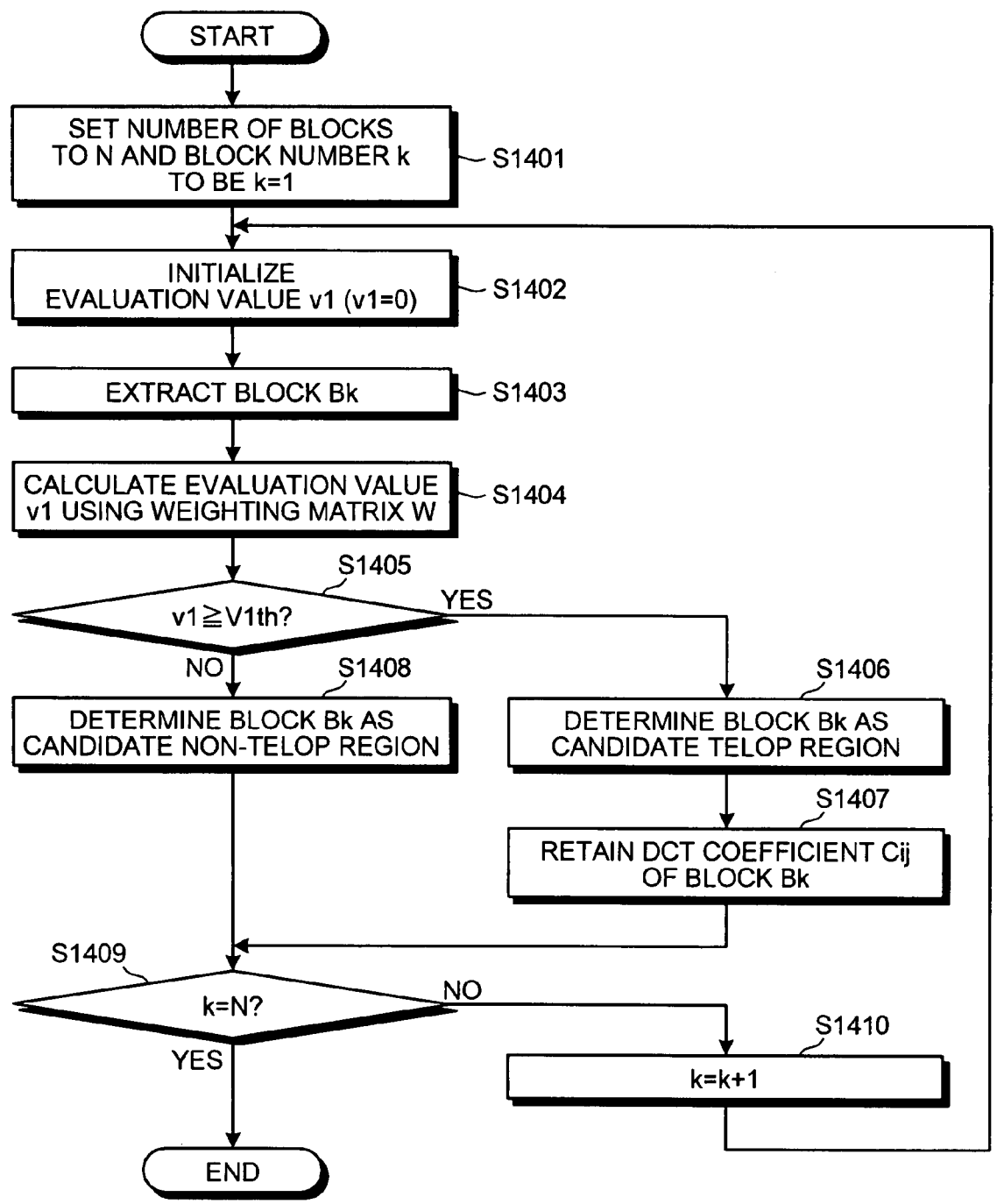
FIG. 14 is a flowchart of a candidate telop region judging process.

Description will be given in detail for a procedure of the candidate telop region judging process at step S1305 shown in FIG. 13. FIG. 14 is a flowchart of the candidate telop region judging process. In FIG. 14, the acquired frame is scanned and the number of blocks is represented as N and the block number k is k=1 (step S1401). The evaluation value v1 is initialized (v1=0) (step S1402) and a block Bk is extracted (step S1403).

Using Equation (5), the evaluation value v1 is calculated by multiplying the absolute value |Cij| of each DCT coefficient Cij of the extracted block Bk by the weighting parameter Wij in the same position as that of the DCT coefficient Cij (step S1404). Whether the evaluation value v1 is equal to or larger than the threshold value V1*th* is judged (step S1405).

When the evaluation value v1 is equal to or larger than the threshold value V1*th* (step S1405: YES), the block Bk is determined as a candidate telop region (step S10406). The DCT coefficient Cij of the block is retained in the memory 1205 as the retained DCT coefficient Dij (step S1407). Thereafter, the procedure moves to step S1409.

When the evaluation value v1 is not equal to or larger than the threshold value V1*th* at step S1405 (step. S1405: NO), the block Bk is determined as a candidate non-telop region (step S1408). When k is not k=N (step S1409: NO), k is incremented (step S1410) and the procedure moves to step S1402. When k is k=N (step S1409: YES), the candidate telop region judging process is finished.

Figure 15:
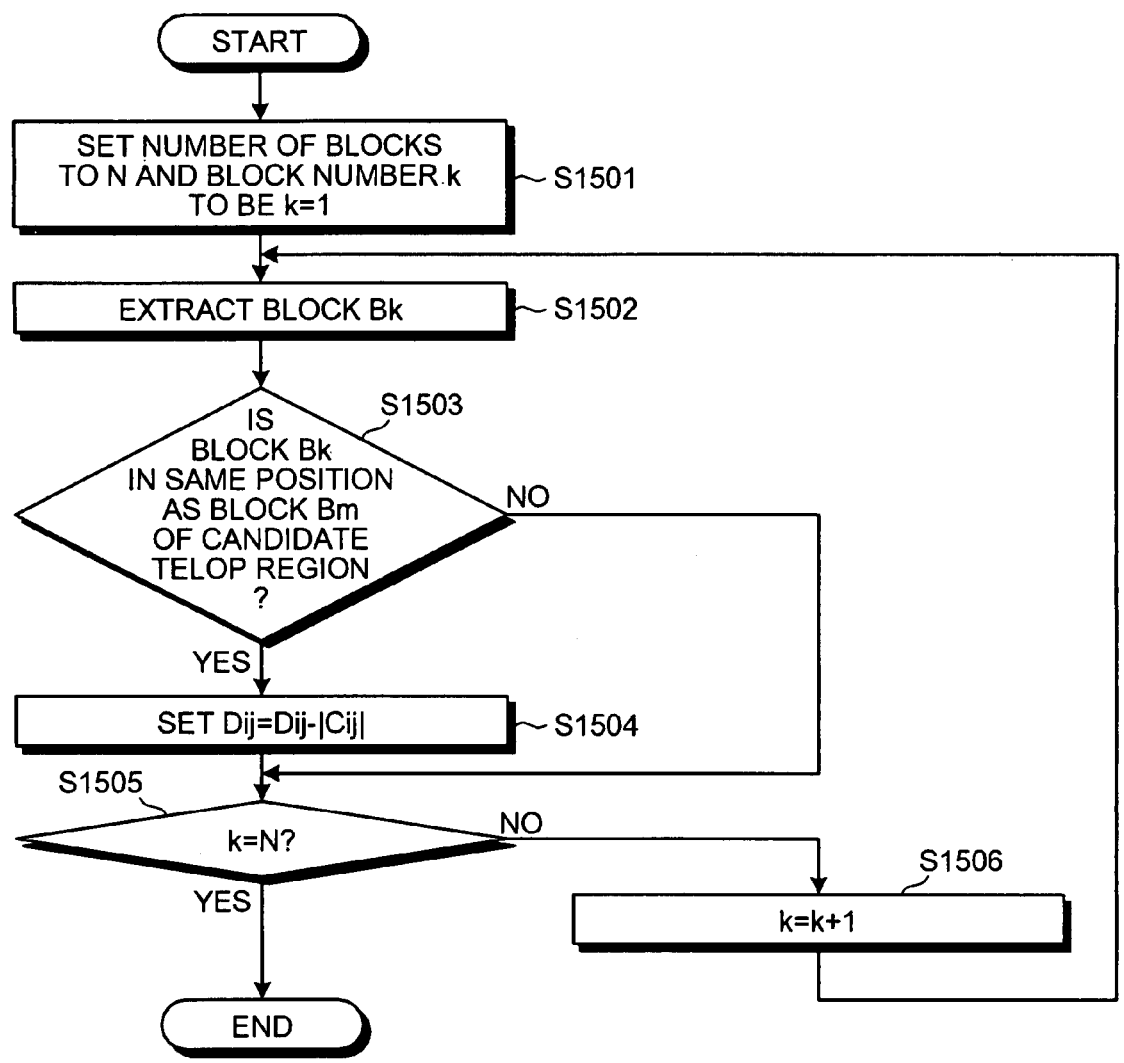
FIG. 15 is a flowchart of a differential image DCT coefficient process.

Description will be given for the differential image DCT coefficient process procedure at step S1309 shown in FIG. 13. FIG. 15 is a flowchart of the differential image DCT coefficient process procedure. In FIG. 15, the acquired frame is scanned and the number of blocks is represented as N and the block number k is k=1 (step S1501). The block Bk is extracted (step S1502).

Whether the position on the frame of the block Bk is same as the position on the frame of a block Bm (block number: m=1, 2, . . . ) determined as the candidate telop region is judged (step S1503). This judgment can be judged by, for example, checking whether the block number k of the block Bk and the block number m of the block Bm coincide with each other.

When the block numbers do not coincide (step S1503: NO), the procedure moves to step S1505. When the block numbers coincide (step S1503: YES), the absolute value |Cij| of the DCT coefficient Cij of the block Bk is used to be subtracted from the retained DCT coefficient Dij stored in the memory, and the retained DCT coefficient Dij is updated (step S1504).

When k is not k=N (step S1505: NO), k is incremented (step S1506) and the procedure moves to step S1502. When k is k=N (step S1505: YES), the differential image DCT coefficient process is finished.

Figure 16:
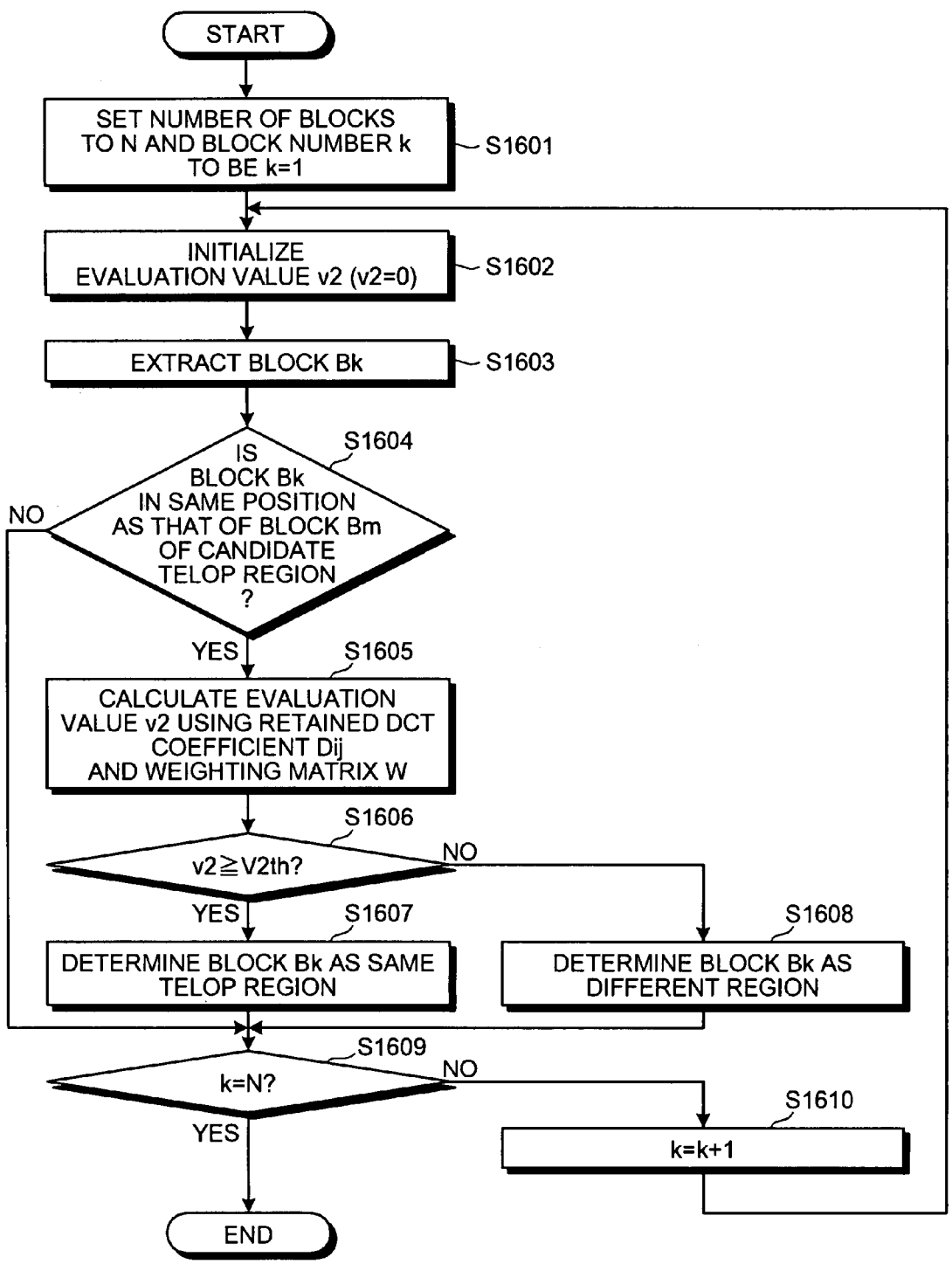
FIG. 16 is a flowchart of a telop region judging process.

Description will be given for a procedure of the telop region judging process at step S1310 shown in FIG. 13. FIG. 16 is a flowchart of the telop region judging process. In FIG. 16, the acquired frame is scanned and the number of blocks is represented as N and the block number k is k=1 (step S1601). The evaluation value v2 is initialized (v2=0) (step S1602) and the block Bk is extracted (step S1603).

Whether the position on the frame of the block Bk is same as the position on the frame of a block Bm (block number: m=1, 2, . . . ) determined as the candidate telop region is judged (step S1604). This judgment can be judged by, for example, checking whether the block number k of the block Bk and the block number m of the block Bm coincide with each other.

When the block numbers do not coincide (step S1604: NO), the procedure moves to step S1609. When the block numbers coincide (step S1604: YES), the evaluation value v2 is calculated using the retained DCT coefficient Dij and (the weighting parameter Dij of) the weighting matrix W and according to the above Equation (6) (step S1605).

Whether the evaluation value v2 calculated is equal to or larger than the threshold value V2*th* is judged (step S1606). When the evaluation value v2 is equal to or larger than the threshold value V2*th* (step S1606: YES), the telop region of the current intraframe predictive coded picture is determined as the telop region same as that of the intraframe predictive coded picture immediately before (step S1607). That is, the fact that the same telop appears in the same position can be detected in the frames from the one at the time when the intraframe predictive coded picture immediately before has appeared to the one of the current intraframe predictive coded picture.

When the evaluation value v2 is not equal to or larger than the threshold value V2th (step S1606: NO), the telop region of the current intraframe predictive coded picture is determined to be in a region different from the telop region of the intraframe predictive coded picture immediately before (step S1608). That is, the fact that the telop is switched in the same position in the series of interframe predictive coded picture input since the intraframe predictive coded picture immediately before has appeared can be detected.

When k is not k=N (step S1609: NO), k is incremented (step S1610) and the procedure moves to step S1602. When k is k=N (step S1609: YES), the telop region judging process is finished.

Figure 17:
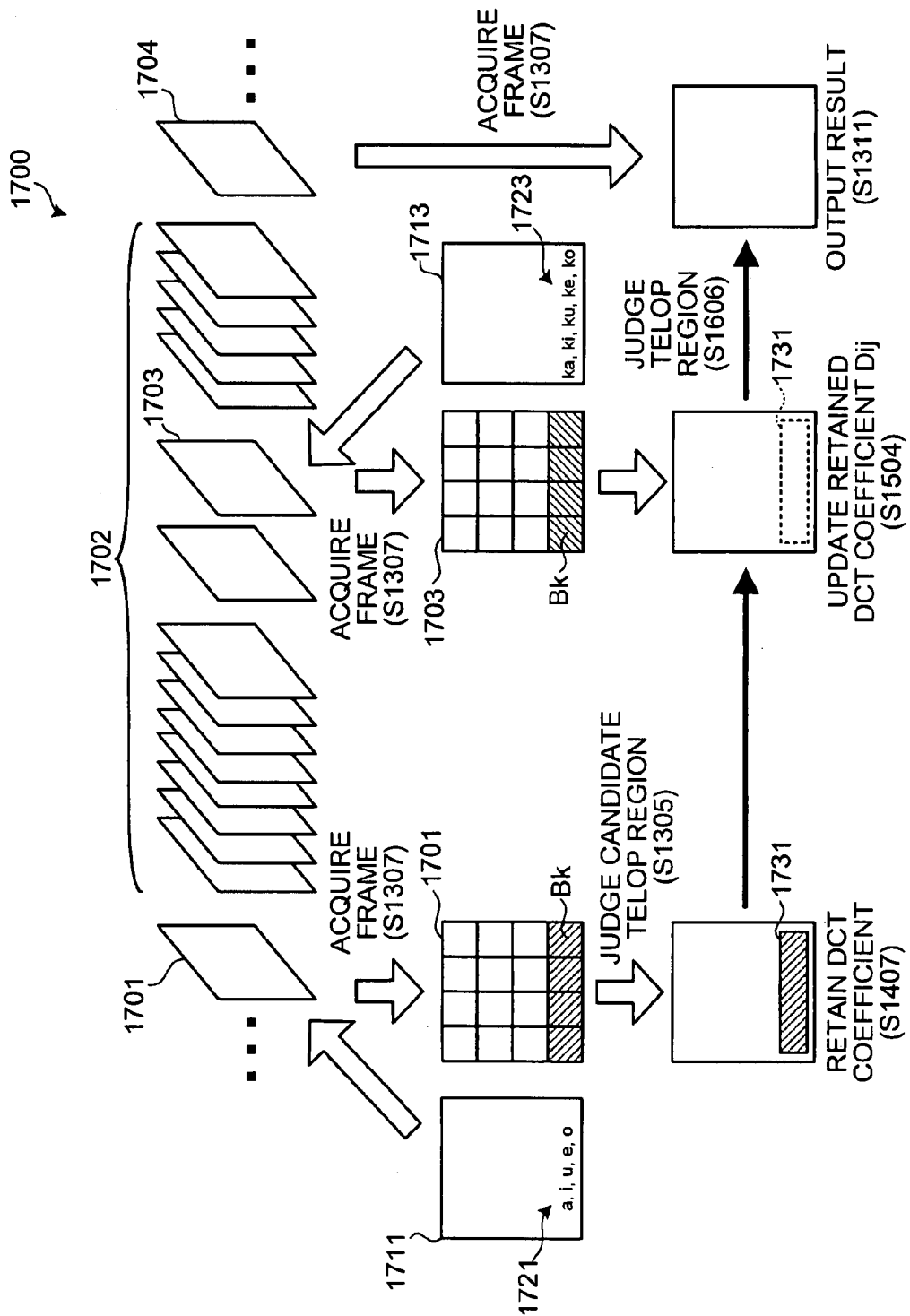
FIG. 17 is a schematic view of a telop detecting process of the second example.

Description will be given schematically for the telop detecting process of the above second example. FIG. 17 is a schematic view of a telop detecting process of the second example. In FIG. 17, the processes corresponding to those of FIGS. 13 to 16 are given the step numbers shown in FIGS. 13 to 16.

In FIG. 17, an MPEG stream 1700 is a series of frames concerning a moving image compressed according to the MPEG compressing encoding format, and includes intraframe predictive coded pictures 1701 and 1704 and a series of interframe predictive coded pictures 1702. The MPEG stream 1700 is input from the MPEG input source 801 shown in FIG. 12.

Assuming that a restored image 1711 of the intraframe predictive coded picture 1701 includes a telop 1721 ("a, i, u, e, o"), the evaluation value v1 of the block Bk (shaded block in FIG. 17) corresponding to the appearing position of a telop 1721 of the block Bk of the intraframe predictive coded picture 1701 acquired from the MPEG steam 1700 is equal to or larger than the threshold value V1th and a candidate telop region 1731 can be detected from the intraframe predictive coded picture 1701.

Assuming that, in the interframe predictive coded picture 1703 in the series of interframe predictive coded pictures 1702, a restored image 1713 of the interframe predictive coded picture 1703 includes a telop 1723 ("ka, ki, ku, ke, ko"), the retained DCT coefficient Dij obtained from the intraframe predictive coded picture 1701 is updated by being subtracted by the DCT coefficient Cij of a block Bk (shaded block in FIG. 17) corresponding to the appearing position of the telop 1723 of the block Bk of the interframe predictive coded picture 1703 (step S1504).

Therefore, this means that, in the series of interframe predictive coded pictures 1702 from the appearance of the intraframe predictive coded picture 1701 immediately before to the new input of the intraframe predictive coded picture 1704, the edge that is the judgment factor of the candidate telop region 1731 of the intraframe predictive coded picture 1701 immediately before has been canceled.

Thereby, in the intraframe predictive coded picture 1704 that has newly appeared, the candidate telop region 1731 of the intraframe predictive coded picture 1701 immediately before is not detected and the discontinuing point between telops can be detected.

Assuming that a telop 1721 ("a, i, u, e, o") same as that of the intraframe predictive coded picture 1701 is present in the same position in the restored image 1713 of the interframe predictive coded picture 1703, the value of the DCT coefficient Cij of the block Bk (shaded block in FIG. 17) corresponding to the appearing position of the telop 1723 of the block Bk of the interframe predictive coded picture 1703 is "zero" or a very small value.

Therefore, the retained DCT coefficient Cij obtained from the intraframe predictive coded picture 1701 is almost not reduced and a (candidate) telop region 1731 same as that of the intraframe predictive coded picture 1701 can be detected in the new intraframe predictive coded picture 1704.

In this manner, according to the above second example, whether an edge keeps appearing without any change in the same position in the space region can be judged by detecting whether a DCT coefficient having a large value in an interframe predictive coded picture has appeared in the same position as that of the DCT coefficient (of mainly a high frequency) that is the factor of the evaluation judgment of the DCT coefficient by an intraframe predictive coded picture.

Therefore, improvement of the telop detection precision can be facilitated. Especially, when telops are displayed sequentially in the same position, the position of the edge varied by the change of characters can be detected.

It is not limit the method to the above method. For example, in the telop region judgment, the method of totaling only the coefficient of the maximal value for each frequency band as described in the first example may be used to the method of evaluating the retained DCT coefficient Dij. Instead of subtracting sequentially by the DCT coefficient Cij that appears in the interframe predictive coded picture, it may be judged whether a DCT coefficient Cij that sufficiently large compared to the retained DCT coefficient Dij has appeared at least once.

Third Example

Description will be given for a telop detecting device according to a third example. The telop detecting device according to the third example is an example of the telop detecting device 500 according to the above second embodiment. A hardware configuration of the telop detecting device according to the third example is same as the hardware configuration of the telop detecting device 800 according to the first example, and therefore, the description thereof is omitted.

In addition to the evaluation of the DCT coefficients, the telop detecting device according to the third example executes the telop detection utilizing the differential value between motion vectors. Description will be given in detail for the difference between the motion vectors.

Figure 18:
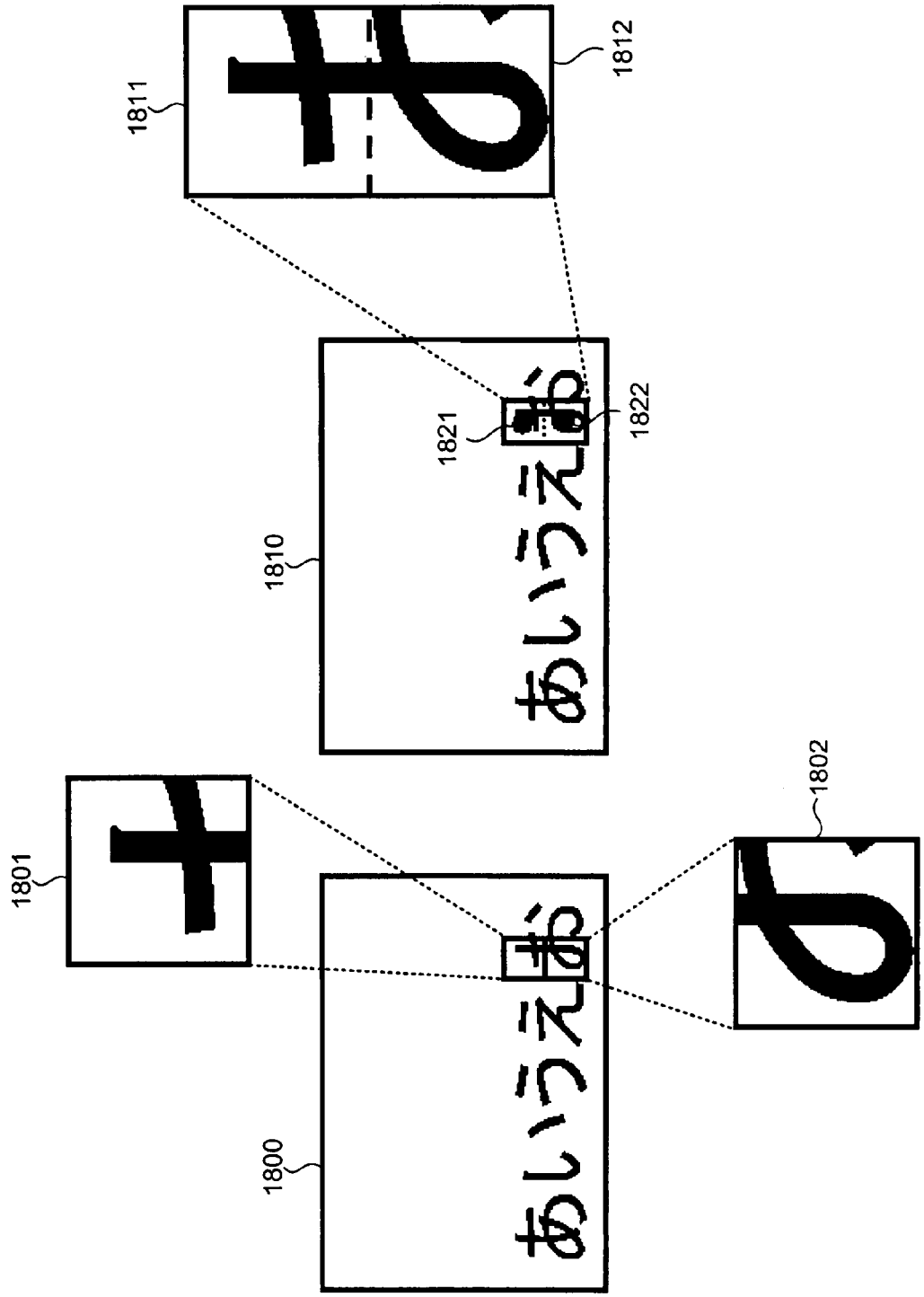
FIG. 18 is a diagram for explaining an example of the difference between motion vectors.

FIG. 18 is a diagram for explaining an example of the difference between motion vectors. FIG. 18 is a diagram for estimation of a frame on the right (an estimated frame 1810) from a frame on the left (a reference frame 1800). The reference frame 1800 and the estimated frame 1810 each display a stationary telop "a, i, u, e, o". Two macro blocks of the estimated frame 1810 should be noted.

The two macro blocks 1811 and 1812 are adjacent to each other and it is assumed that the one macro block 1811 is a notable macro block and the other macro block 1812 is a surrounding macro block. The two macro blocks 1811 and 1812 are estimated from the same positions as those of macro blocks 1801 and 1802 in the reference frame 1800.

The shape of a portion of the stationary telop "a, i, u, e, o" included in both of the macro blocks 1811 and 1812 in the estimated frame 1810 is identical with the shape of a portion of the stationary telop "a, i, u, e, o" in the same position in the macro blocks 1801 and 1802 of the reference frame. Therefore, no variation is present between the reference frame 1800 and the estimated frame 1810.

Therefore, the vector lengths of the motion vectors 1821 and 1822 of the two macro blocks 1811 and 1812 in the estimated frame 1810 are same (in this case, both "zero"). Therefore, the difference between the motion vectors 1821 and 1822 of the two macro blocks 1811 and 1812 is also "zero". Therefore, it can be seen that the notable macro block 1811 is likely to be a telop.

Figure 19:
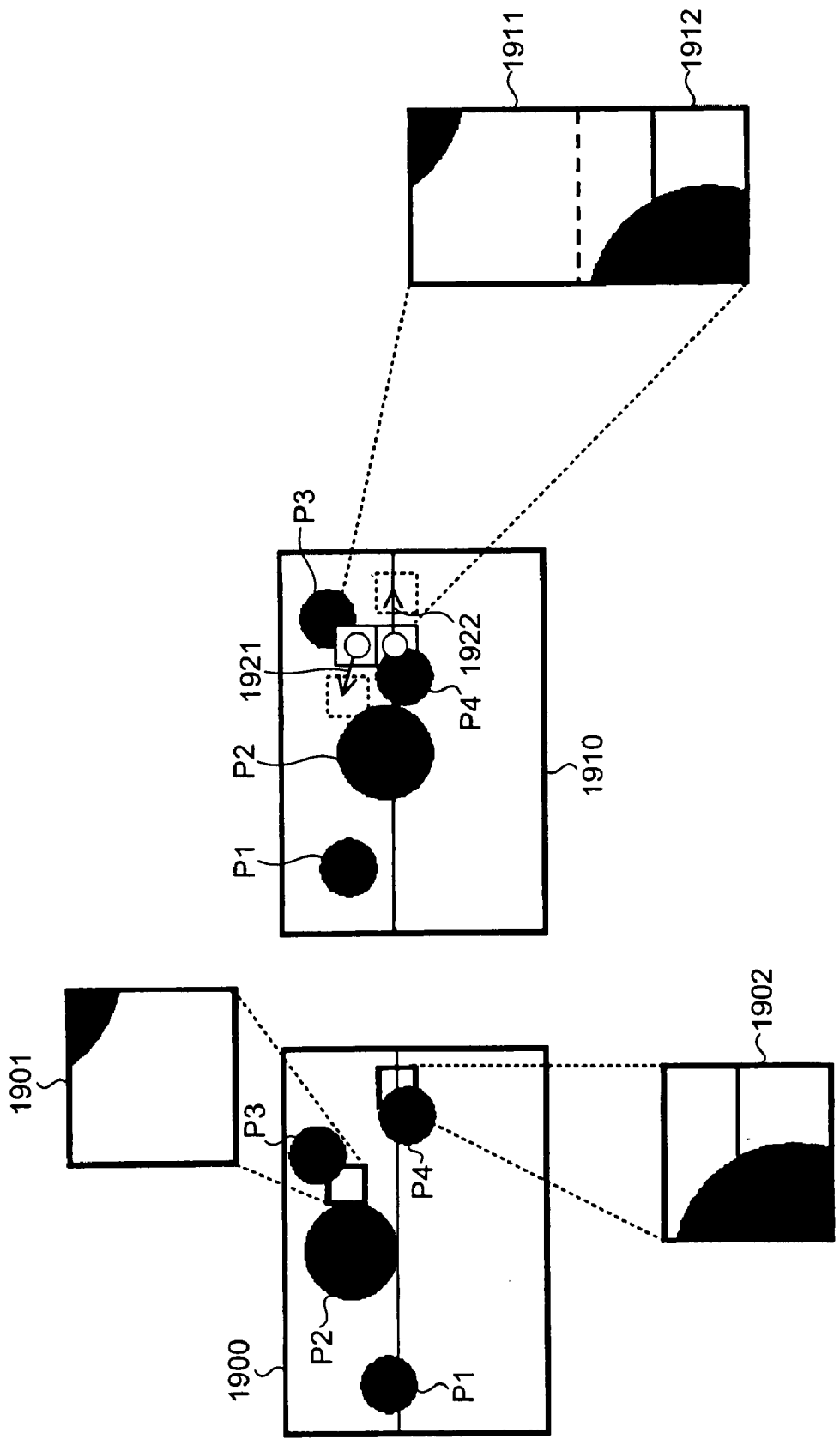
FIG. 19 is a diagram for explaining another example of the difference between motion vectors.

FIG. 19 is a diagram for explaining another example of the difference between motion vectors. FIG. 19 is also a diagram for estimation of a frame on the right (an estimated frame 1910) from a frame on the left (a reference frame 1900). In FIG. 19, the reference frame 1900 and the estimated frame 1910 both display objects P1 to P4, and by varying the positions thereof between the frames, the objects P1 to P4 are represented as the objects P1 to P4 that move irregularly. Macro blocks in the estimated frame 1910 are focused.

The two macro blocks 1911 and 1912 are adjacent to each other and it is assumed that the one macro block 1911 is a notable macro block and the other macro block 1912 is a surrounding macro block. The two macro blocks 1911 and 1912 are estimated from positions different from those of macro blocks 1901 and 1902 in the reference frame 1900.

That is, the image in the notable macro block 1911 of the estimated frame 1910 is an image obtained by a move of the macro block 1901 in the reference frame 1900 following the object P3 of the reference frame 1900, and the amount of the move is provided as a motion vector 1921. Similarly, the image in the surrounding macro block 1912 of the estimated frame 1910 is an image obtained by a move of the macro block 1902 in the reference frame 1900 following the object P4 of the reference frame 1900, and the amount of the move is provided as a motion vector 1922 that is different from the motion vector 1921.

Therefore, because the two macro blocks 1911 and 1912 adjacent to each other of the estimated frame 1910 are estimated from the two macro blocks 1901 and 1902 that are not adjacent to each other of the reference frame 1900, the motion vectors 1921 and 1922 of the two macro blocks 1911 and 1912 adjacent to each other of the estimated frame 1910 are different from each other. Therefore, the difference between the two motion vectors 1921 and 1922 is not "zero" and it can be seen that the notable macro block 1911 is not likely to be a telop.

(Functional Configuration of Telop Detecting Device)

Figure 20:
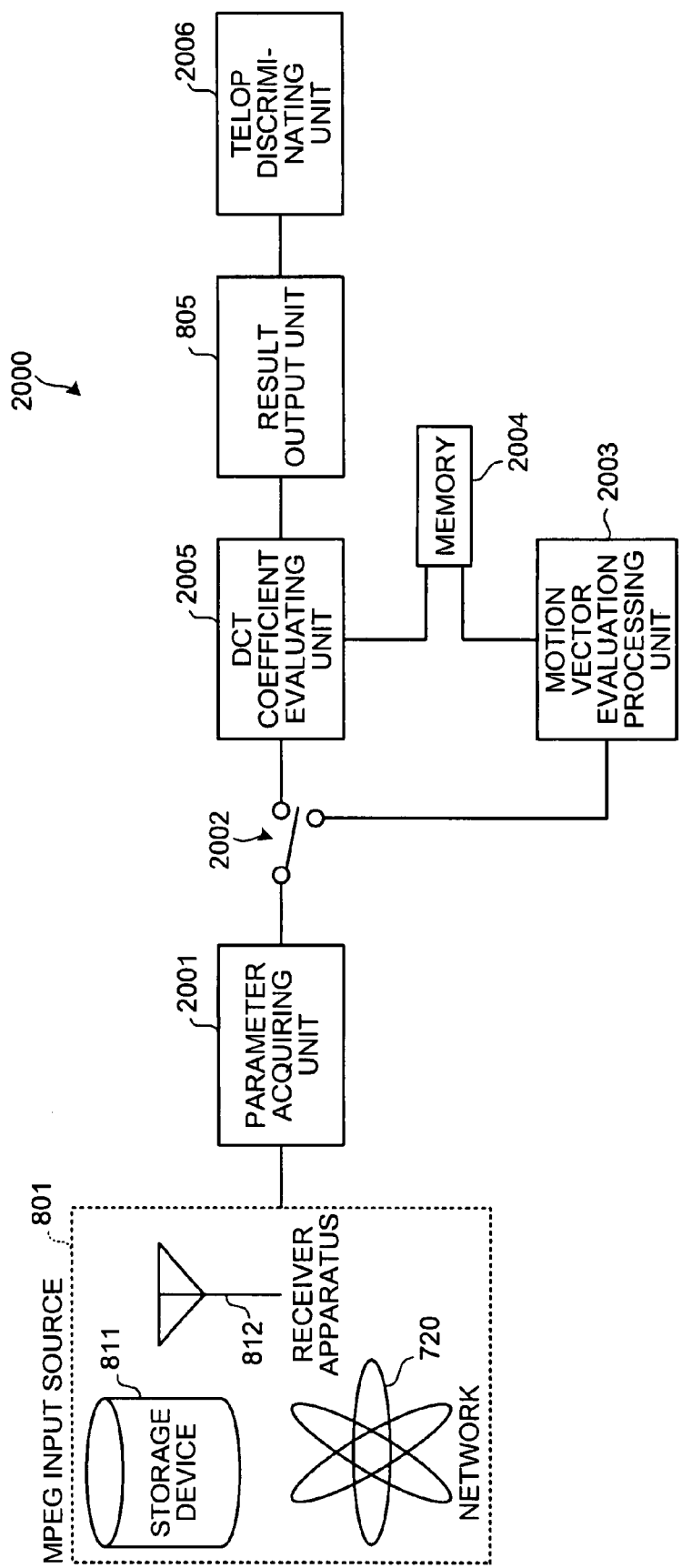
FIG. 20 is a block diagram of the functional configuration of a telop detecting device according to a third example.

Description will be given for a functional configuration of the telop detecting device according to the third example. FIG. 20 is a block diagram of the functional configuration of the telop detecting device according to the third example. The components same as the components of the first example shown in FIG. 8 are given the same reference numerals and the description thereof is omitted.

As shown in FIG. 20, a telop detecting device 2000 includes the MPEG input source 801, the result output unit 805, a parameter acquiring unit 2001, a switch 2002, a motion vector evaluation processing unit 2003, a memory 2004, a DCT coefficient evaluating unit 2005, and a telop discriminating unit 2006.

The parameter acquiring unit 2001 interprets an MPEG stream input from the MPEG input source 801, and acquires parameters necessary for detecting a telop by extracting an intraframe predictive coded picture and an interframe predictive coded picture from the MPEG stream. Similarly to the first example, the parameters in this case also include motion vectors in addition to the information on the image type of the frame extracted and the DCT coefficient of each block. The information on the image type of a frame is information indicating whether the frame extracted is an intraframe predictive coded picture or an interframe predictive coded picture, and is attached to the header of each frame.

The parameter acquiring unit 2001 corresponds to the interframe predictive coded picture acquiring unit 501 and the intraframe predictive coded picture acquiring unit 504 shown in FIG. 5, and more specifically, realizes the function thereof, for example, by the CPU 701 executing of a program stored in a recording medium such as the ROM 702, the RAM 703, the HD 705, and the CD/DVD 707 shown in FIG. 7, or by the communication I/F 714.

The switch 2002 connects to the DCT coefficient judging unit 2005 and outputs a DCT coefficient Cij of the intraframe predictive coded picture when the image type of the frame acquired by the parameter acquiring unit 2001 is the intraframe prediction coded type. When the image type of the frame acquired by the parameter acquiring unit 2001 is the interframe prediction coded type, the switch 2002 connects to the motion vector evaluation processing unit 2003 and outputs a motion vector of the interframe predictive coded picture.

The switch 2002 corresponds to the interframe predictive coded picture acquiring unit 501, the macro block extracting unit 502, the intraframe predictive coded picture acquiring unit 504, and the block extracting unit 505 shown in FIG. 5, and more specifically, realizes the function thereof, for example, by the CPU 701 executing of a program stored in a recording medium such as the ROM 702, the RAM 703, the HD 705, and the CD/DVD 707 shown in FIG. 7.

The motion vector evaluation processing unit 2003 calculates a total value T of motion vectors based on the differences of the above motion vectors and stores temporarily the calculation result in the memory 2004. For the total value T of the motion vectors, the total value T may be calculated from not only the differences between the motion vectors but also motion vector lengths and motion vector code lengths.

The motion vector evaluation processing unit 2003 corresponds to the first calculating unit 503 shown in FIG. 5, and more specifically, realizes the function thereof, for example, by the CPU 701 executing of a program stored in a recording medium such as the ROM 702, the RAM 703, the HD 705, and the CD/DVD 707 shown in FIG. 7.

The memory 2004 stores the total value T of the motion vectors calculated by the motion vector evaluation processing unit 2003. The total value T of the motion vectors is extracted by the DCT coefficient evaluating unit 2005 and is used in the DCT coefficient evaluating process. The memory 2004 corresponds to the first calculating unit 503 and the second calculating unit 506 shown in FIG. 1, and more specifically, realizes the function thereof, for example, by a recording medium such as the ROM 702, the RAM 703, the HD 705, and the CD/DVD 707 shown in FIG. 7.

The DCT coefficient evaluating unit 2005 evaluates the DCT coefficient of an intraframe predictive coded picture in the same approach as that of the first example. More specifically, the DCT coefficient evaluating unit 2005 calculates the evaluation value v by weighting the DCT coefficient Cij of each block in the intraframe predictive coded picture acquired through the switch 2002 using the weighting matrix W, and evaluates the DCT coefficient Cij using the evaluation value v calculated and the total value T stored in the memory 2004. Thereby, a telop region can be detected.

The DCT coefficient evaluating unit 2005 corresponds to the first calculating unit 503 and the detecting unit 507 shown in FIG. 5, and more specifically, realizes the function thereof, for example, by the CPU 701 executing of a program stored in a recording medium such as the ROM 702, the RAM 703, the HD 705, and the CD/DVD 707 shown in FIG. 7.

The telop discriminating unit 2006 discriminates whether the telop in the telop region detected by the DCT coefficient evaluating unit 2005 is a stationary telop or a roll telop based on the motion vector of the notable macro block and the motion vector of the surrounding macro blocks thereof. More specifically, the discrimination is executed using the direction and the vector length of the motion vectors in the telop region.

The telop discriminating unit 2006 corresponds to the judging unit 510 shown in FIG. 5, and more specifically, realizes the function thereof, for example, by the CPU 701 executing of a program stored in a recording medium such as the ROM 702, the RAM 703, the HD 705, and the CD/DVD 707 shown in FIG. 7.

(Procedure of Telop Detecting Process)

Figure 21:
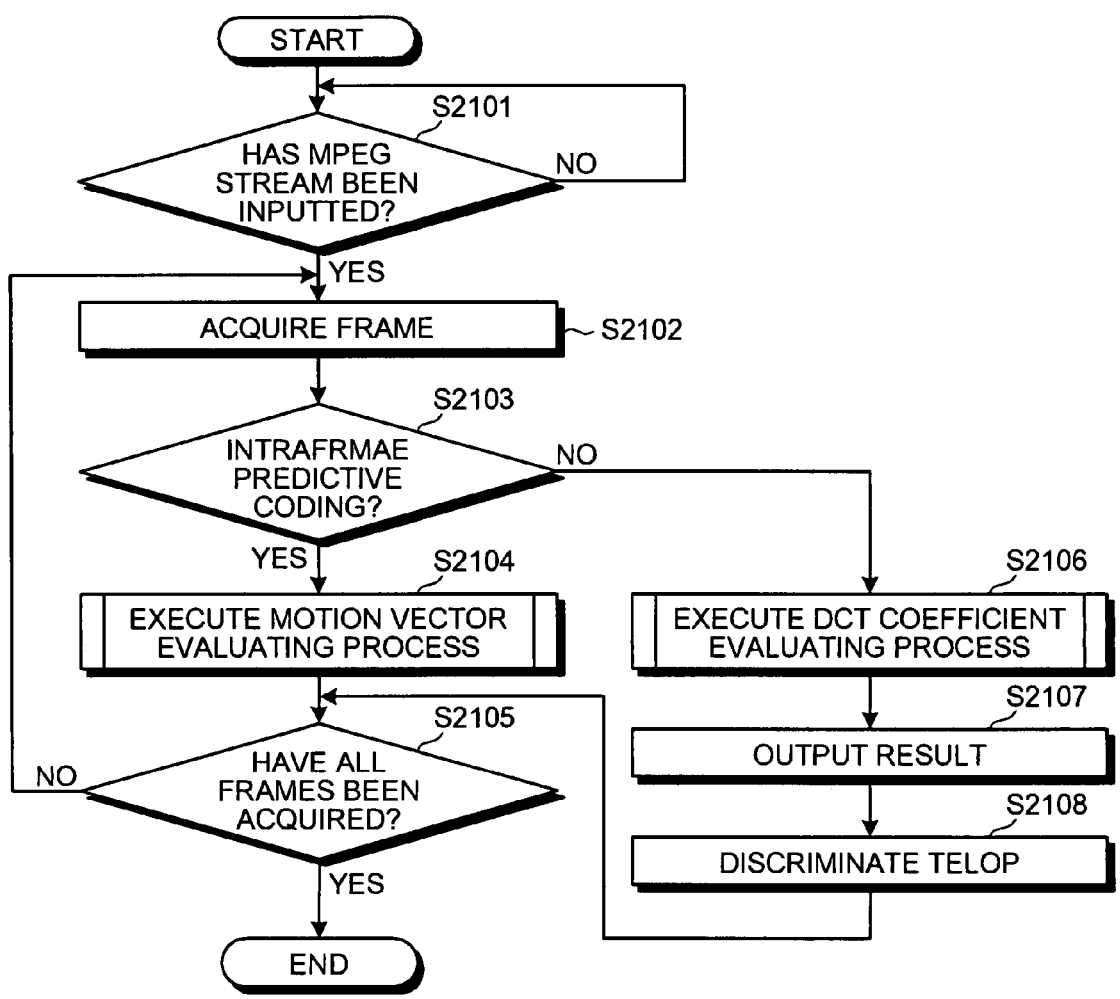
FIG. 21 is a flowchart of a telop detecting process according to the third example.

Description will be given for a procedure of telop detecting process according to the third example. FIG. 21 is a flowchart of the telop detecting process procedure according to the third example. When an MPEG stream is input (step S2101: YES), a frame at the head is acquired from the MPEG stream (step S2102).

The image type of the frame acquired is identified from information on the image type of the frame acquired (step S2103). In this case, when the image type of the frame acquired is between-frame estimation encoding (step S2103: YES), a motion vector evaluating process is executed (step S2104).

When not all of the frames are acquired (step S2105: NO), the procedure goes to step S2102 and the next frame is acquired. When all of the frames are acquired (step S2105: YES), the series of process steps are finished.

When the image type of the frame acquired is in-frame estimation encoding (step S2103: NO), the DCT coefficient evaluating process is executed (step S2106). The result of the telop detection is output (step S2107). Thereafter, the telop is discriminated (step S2108) and the procedure moves to step S2105. This discrimination process of the telop will be described later.

Figure 22:
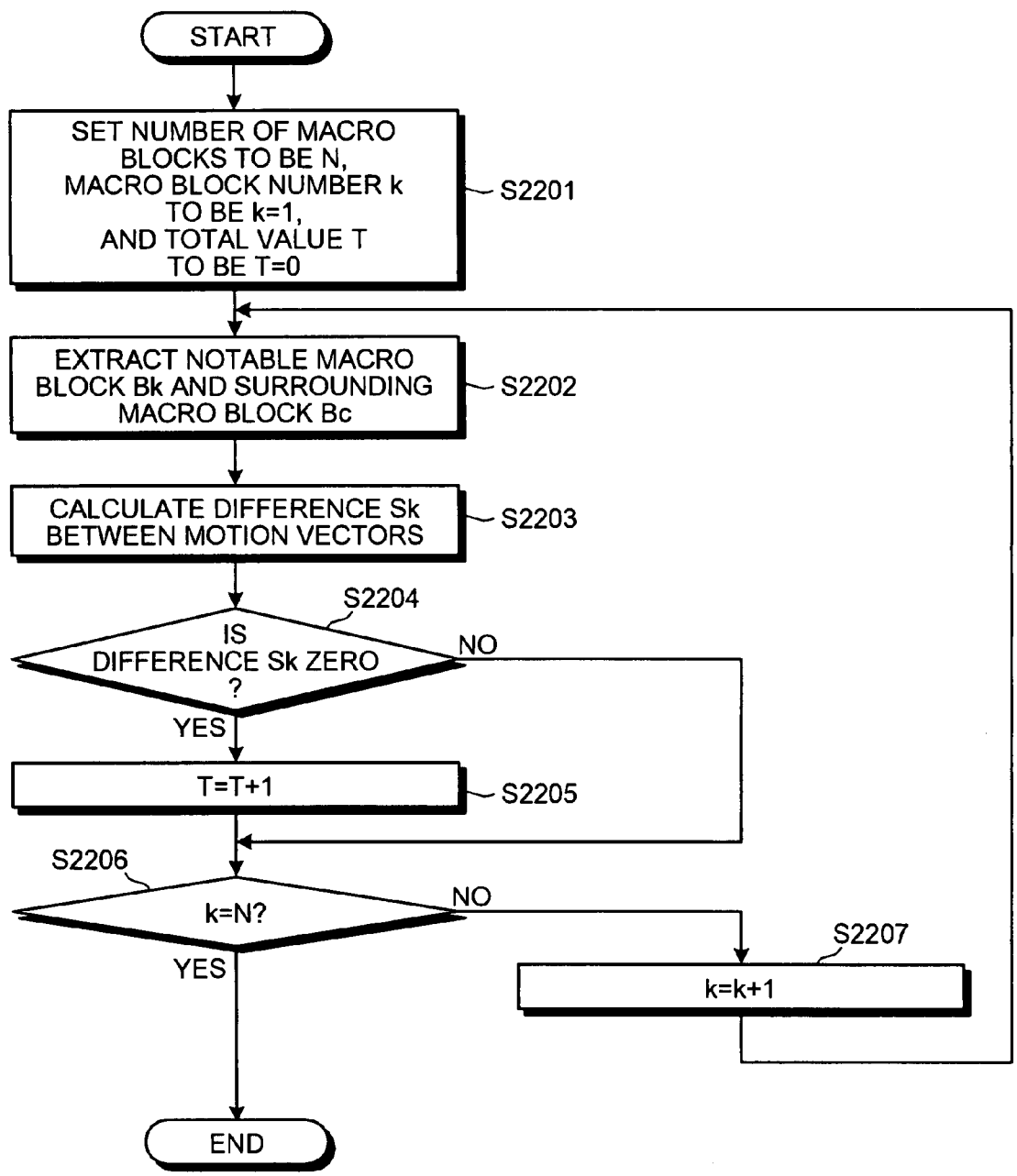
FIG. 22 is a flowchart of a motion vector evaluating process.

Description will be given for a procedure of the motion vector evaluating process at step S2104 shown in FIG. 21. FIG. 22 is a flowchart of the motion vector evaluating process procedure. As shown in FIG. 22, for the frame acquired at step S2102 (the interframe predictive coded picture), the number of macro blocks is N, the macro block number k is k=1, and the total value T is T=0 (step S2201).

The notable macro block Bk and the surrounding macro block Bc thereof are extracted (step S2202). The difference Sk between the motion vector of the notable macro block Bk and the motion vector of the surrounding macro block Bc thereof are calculated (step S2203).

When the difference Sk between the motion vectors is zero (step S2204: YES), the total value T is incremented (step S2205) and the procedure moves to step S2206. When the difference Sk between the motion vectors is not zero (step S2204: NO), the procedure moves to step S2206 without incrementing the total value T.

When k is not k=N (step S2206: NO), k is incremented (step S2207) and the procedure moves to step S2202. When k is k=N (step S2206: YES), the motion vector evaluating process is finished.

Figure 23:
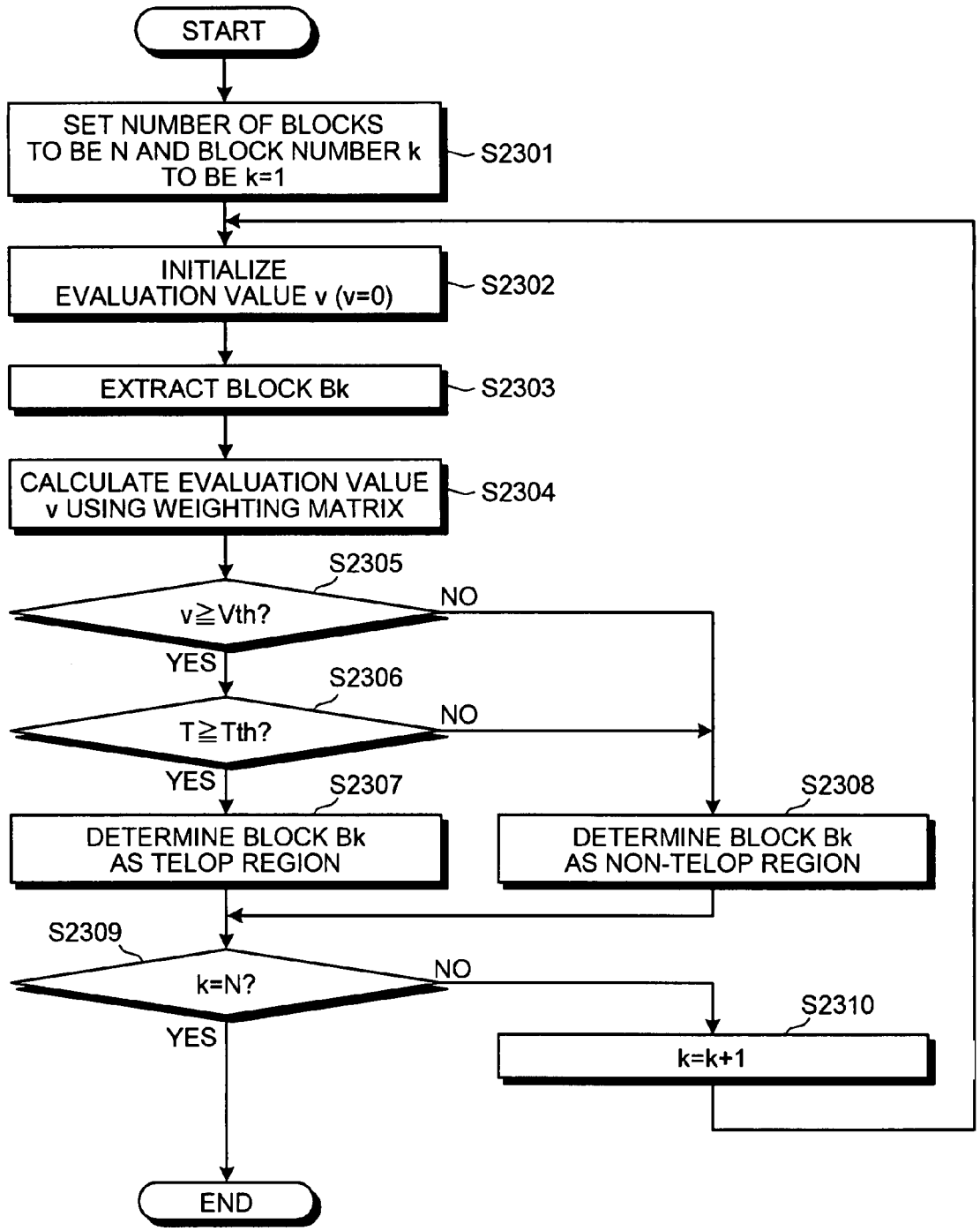
FIG. 23 is a flowchart of another DCT coefficient evaluating process.

Description will be given for the DCT coefficient evaluating process procedure at step S2106 shown in FIG. 21. FIG. 23 is a flowchart of the DCT coefficient evaluating process procedure. In FIG. 23, the acquired frame is scanned, and the number of blocks is N and the block number k is k=1 (step S2301). The evaluation value v is initialized (v=0) (step S2302) and the block Bk is extracted (step S2303).

Using Equation (1), the evaluation value v is calculated by multiplying the absolute value |Cij| of each DCT coefficient Cij of the extracted block by the weighting parameter Wij in the same position as that of the DCT coefficient Cij (step S2304). Whether the evaluation value v is equal to or larger than the threshold value Vth is judged (step S2305).

When the evaluation value v is equal to or larger than the threshold value Vth (step S2305: YES), whether the total value T calculated at step S2205 is equal to or larger than the threshold value Tth thereof is judged (step S2306). The total value T calculated at step S2205 is the total value of the macro block including the block. When the total value T is equal to or larger than the threshold value Tth thereof (step S2306: YES), the block Bk is determined as the telop region (step S2307).

When the evaluation value v is not equal to or larger than the threshold value Vth at step S2305 (step S2305: NO), or when the total value T is not equal to or larger than the threshold value Tth thereof (step S2306: NO), the block Bk is determined as the non-telop region (step S2308).

When k is not k=N (step S2309: NO), k is incremented (step S2310) and the procedure moves to step S2302. When k is k=N (step S2309: YES), the DCT coefficient evaluating process is finished.

Figure 24:
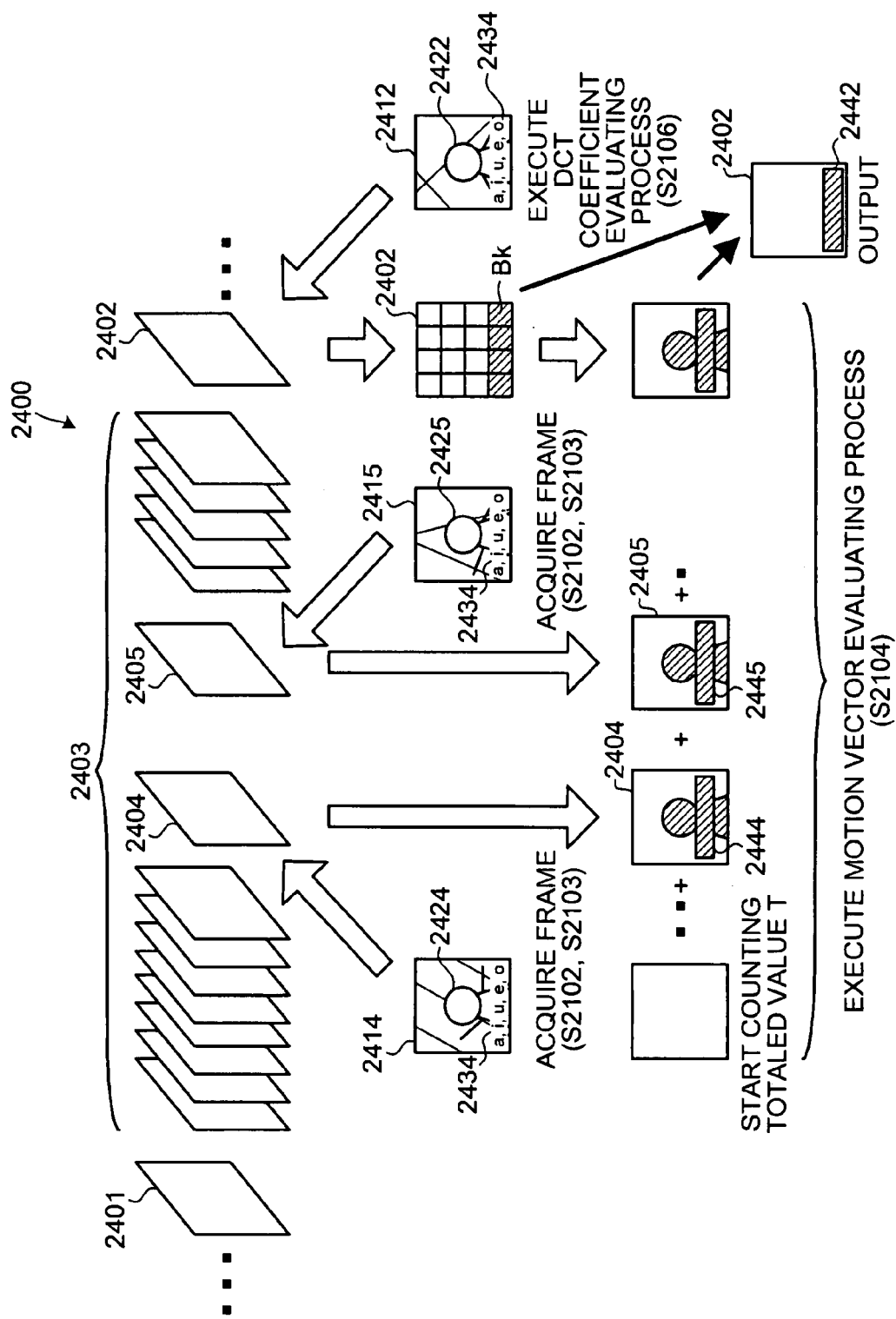
FIG. 24 is a schematic view of a telop detecting process of the third embodiment.

Description will be given schematically for the telop detecting process of the above third example. FIG. 24 is a schematic view of a telop detecting process of the third embodiment. In FIG. 24, process steps corresponding to those in FIG. 21 are given the same step numbers as those shown in FIG. 21.

In FIG. 24, an MPEG stream 2400 is a series of frames concerning a moving image compressed according to the MPEG compressing encoding format, and includes intraframe predictive coded pictures 2401 and 2402, and a series of interframe predictive coded pictures 2403. The MPEG steam 2400 is input from the MPEG input source 801.

Noting an arbitrary interframe predictive coded picture 2404 of the series of interframe predictive coded picture 2403, a restored image 2414 thereof includes an object 2424 and a telop 2434 ("a, i, u, e, o").

When the motion vector evaluating process (S2104) is executed to the interframe predictive coded picture 2404 acquired at steps S2102 and S2103, a set 2444 of the notable macro blocks Bk that have made the same move as that of the surrounding macro block Bc is detected. The set 2444 of the notable macro blocks Bk is a set of the notable macro blocks Bk for which the difference between the blocks Bk and the surrounding macro block Bc is "zero" and the number of the notable macro blocks Bk with the difference of "zero" is counted as the total value T. It is assumed that the object 2424 mostly is stationary or uniformly moves spatially.

Noting an interframe predictive coded picture 2405 immediately after the interframe predictive coded picture 2404, a restored image 2415 thereof includes an object 2425 and the telop 2434 ("a, i, u, e, o").

When the motion vector evaluating process (S2104) is executed to the interframe predictive coded picture 2405 acquired at steps S2102 and S2103, a set 2445 of the notable macro blocks Bk that have made the same move as that of the surrounding macro blocks Bc is detected. The set 2445 of the notable macro blocks Bk is a set of the notable macro blocks Bk for which the difference between the blocks Bk and the surrounding macro block Bc is "zero" and the number of the notable macro blocks Bk with the difference of "zero" is further counted as the total value T. It is assumed that the object 2425 mostly is stationary or uniformly moves spatially.

The motion vector evaluating process (S2104) is continued until the intraframe predictive coded picture 2402 newly appears. When the intraframe predictive coded picture 2402 is acquired, the telop region of the intraframe predictive coded picture 2402 is detected using the total value T of the whole series of interframe predictive coded picture 2403.

More specifically, it is assumed that a restored image 2412 of the intraframe predictive coded picture 2402 includes an object 2422 and a telop 2434 ("a, i, u, e, o"). When the evaluation value v of the macro block Bk (shaded block in FIG. 24) corresponding to the appearing position of the telop 2434 of the block Bk of the intraframe predictive coded picture 2402 acquired in the DCT counting evaluating process (S2106) is equal to or larger than the threshold value Vth and the total value T of whole the series of interframe predictive coded pictures 2403 is equal to or larger than the threshold value Tth for the macro block to which the block Bk belongs, a telop region 2442 including the telop 2434 can be detected in the intraframe predictive coded picture 2402.

Therefore, in the third example, whether the motion vector has a nature of including a telop is judged for each position of a macro block while the interframe predictive coded pictures sequentially continue, and the number of times of appearance of the nature of including a telop is counted. When an intraframe predictive coded picture appears, for this intraframe predictive coded picture, a telop region is judged in the same method as that of the first example and whether the total value T of the counts between the previous intraframe predictive coded picture and the current one in the macro block to which each block of the telop belongs is equal to or larger than the threshold value Tth, that is, whether the number of times of appearance of the frames having a motion vector suggesting the possibility of a telop is large is judged. A region that satisfies both of the above is detected as a telop region.

Figure 25:
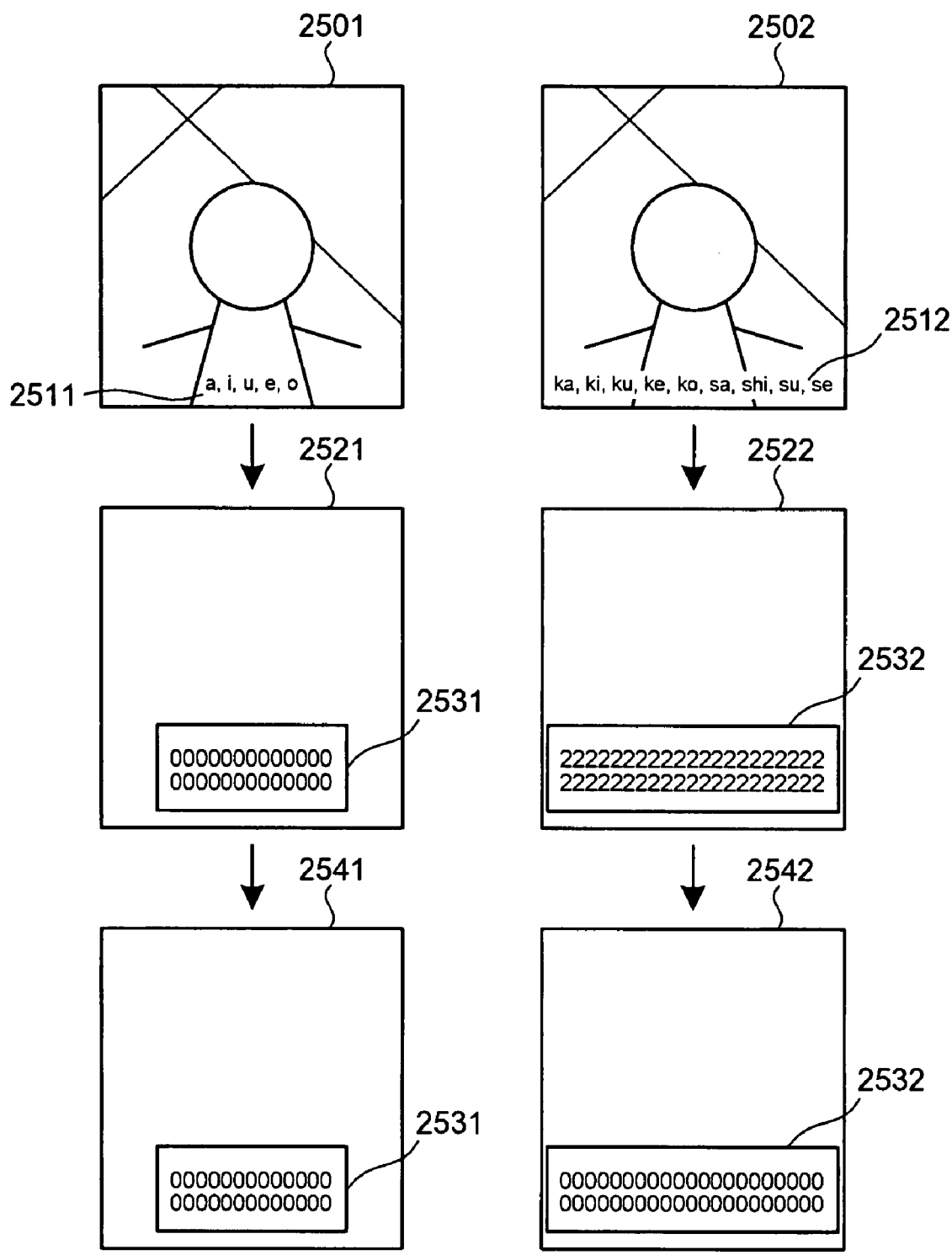
FIG. 25 is a diagram for explaining the difference between motion vectors.

Description will be given in detail for the difference between the motion vectors together with the discrimination of a detected telop. FIG. 25 is a diagram for explaining the difference between the motion vectors. In FIG. 25, two restored images 2501 and 2502 are images having the identical backgrounds and objects. A stationary telop 2511 is present in the restored image 2501 and a roll telop 2512 that runs from the right to the left on the screen is present in the restored image 2502.

In an image 2521 obtained by compensating the motion of the interframe predictive coded picture of the restored image 2501, no motion compensation in a telop region 2531 corresponding to the position of the stationary telop 2511 is executed, that is, the motion vector value is zero. For the image 2541 formed by taking the difference between the motion vectors of the notable macro block and the surrounding macro block in the motion-compensated image 2521, the difference between the motion vectors in the telop region 2531 corresponding to the position of the stationary telop 2511 is also "zero".

Because the roll telop 2512 runs from the right to the left on the screen, in the image 2522 obtained by executing the motion compensation to the interframe predictive coded picture of the restored image 2502, the motion vectors in the telop region 2532 corresponding to the position of the roll telop 2512 are uniform. In this case, the motion vectors all are "oriented to the right" and have the length of "two".

However, for the image 2542 formed by taking the difference between the motion vectors of the notable macro block and the surrounding macro block in the motion-compensated image 2522, the difference between the motion vectors in the telop region 2532 corresponding to the position of the roll telop 2512 is also "zero".

Therefore, in the third example, by using the difference between the motion vectors, regardless of whether a stationary telop or a roll telop, a telop can be detected. Because the difference between the motion vectors is "zero" for both of a stationary telop and a roll telop, the telop type can not be discriminated. However, noting the motion-compensated images 2521 and 2522, the motion vector length is zero in the image 2521 because no motion compensation has been executed, however, non-zero-motion vectors uniformly appear in the image 2522.

Therefore, even in the case where the difference between the motion vectors for the detected telop is "zero", a telop in a telop region detected can be discriminated as a roll telop when the motion vectors are non-zero in the motion compensation.

In the above motion vector evaluating process, the difference between the motion vector of the notable macro block Bk and the motion vector of the surrounding macro block Bc is calculated and the number of times at which the difference is "zero" is used as the coefficient of the total value T. However, the values of the difference between the motion vector of the notable macro block Bk and the motion vector of the surrounding macro block Bc may be counted without processing the values and the differences may be accumulated.

Figure 26:
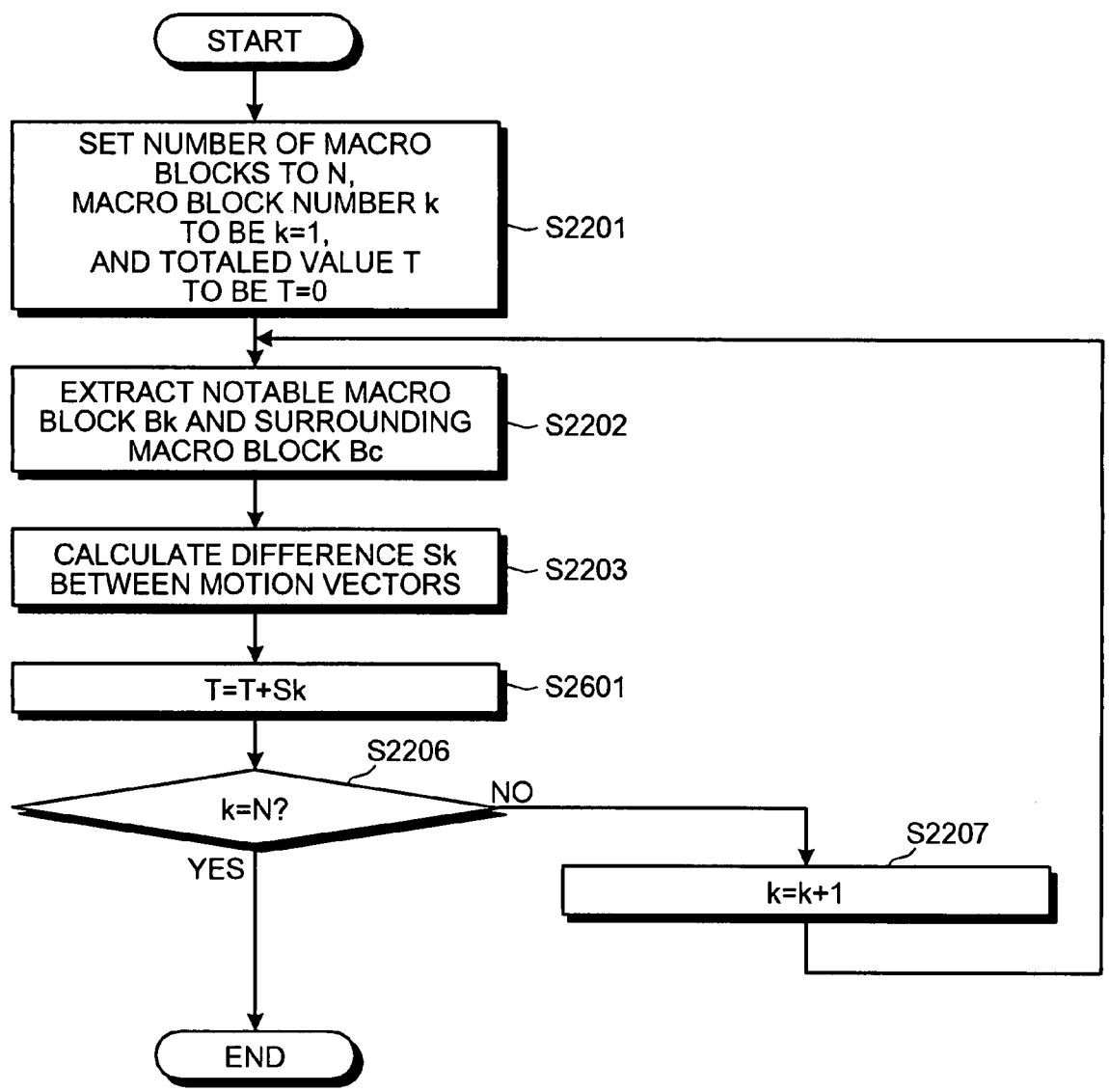
FIG. 26 is another flowchart of the motion vector evaluating process.

Description will be give for the motion vector evaluating process in this case. FIG. 26 is another flowchart of the motion vector evaluating process procedure. In FIG. 26, the steps same as those in FIG. 22 are given the same step numbers and the description thereof is omitted. After step S2203, the total value T is updated by adding the difference Sk between the motion vectors to the total value T (step S2601). Thereafter, the procedure moves to step S2206.

Because the total value T is an accumulated value of the differences Sk in this motion vector evaluating process procedure, the branching after step S2306 shown in FIG. 23 is inversed. That is, when the evaluation value v is equal to or larger than the threshold value Vth (step S2305: YES) and the total value T is not equal to or larger than the threshold value Tth (step S2306: NO), the macro block Bk is determined as a telop region. When the evaluation value v is not equal to or larger than the threshold value Vth (step S2305: NO) or the total value T is equal to or larger than the threshold value Tth (step S2306: YES), the macro block Bk is determined as a non-telop region.

That is, though this motion vector evaluating process procedure uses the motion vectors of the interframe predictive coded picture, the values for judging whether the motion vectors suggest the possibility of a telop for the positions of the macro blocks are accumulated while the interframe predictive coded pictures continue. For example, the differences Sk between the motion vectors of the notable macro blocks Bk and the motion vectors of the surrounding macro blocks Bc are accumulated.

When the intraframe predictive coded picture appears, for this intraframe predictive coded picture, the telop region is judged in the same method as that of the first example, and whether the total value T accumulated between the previous intraframe predictive coded picture and the intraframe predictive coded picture currently appearing is equal to or larger than the threshold value Tth is judged. The block is determined as a telop region based on both of the judgment results.

In this manner, according to the third example, by utilizing the difference between the motion vectors, regions gathering together in one in an image can be extracted relatively easily.

Thereby, regions that continue irregularly can be distinguished from a telop region and improvement of the precision of the telop region detection can be facilitated.

By using the motion compensation, simultaneously with a stationary telop, a telop moving regularly (for example, a running telop such as a staff roll) can also be detected. Depending on the manner of encoding, in most macro blocks, motion vectors are encoded by the difference value between the motion vector and that of the adjacent macro block. Therefore, this process can be realized with very small load and in a simple method.

The telop detecting method described in the embodiment can be realized by executing a program prepared in advance on a computer such as a personal computer or a work station. This program is recorded in a computer-readable recording medium such as a hard disk, a flexible disk, a CD-ROM, an MO, a DVD, and is executed by being read from the recording medium by the computer. This program may be a transmission medium distributable through a network such as the Internet.

As above, the telop detecting method, the telop detecting program, and the telop detecting device according to the embodiments are useful for a digital video recorder (a DVD recorder, an HDD recorder, an HDD/DVD recorder), a home server, a car navigating apparatus, a computer (a personal computer), a computer peripheral device, a portable terminal, an information terminal, a portable telephone, a consumer gaming machine, and all other products that handle digital video. The compressing encoding scheme is not limited to the MPEG.

The invention claimed is:

1. A telop detecting method comprising:
acquiring, using a processor, an intraframe predictive coded picture from a series of frames of a moving image compressed and encoded using an orthogonal transformation from a space region to a frequency region;
extracting, using the processor, a block from the intraframe predictive coded picture;
calculating, using the processor, an evaluation value indicative of a possibility of presence of a telop in the block, by assigning weights to frequency components in the block using a weighting matrix such that a higher value is assigned to a frequency component of a higher frequency band; and
detecting, using the processor, a telop region that includes a telop from the frame based on the evaluation value.

2. The telop detecting method according to claim 1, further comprising:
determining, using the processor, whether the evaluation value is larger than a threshold; and
identifying, using the processor, the block as the telop region when the evaluation value is determined to be larger than the threshold at the determining.

3. A telop detecting method comprising:
acquiring, using a processor, a first intraframe predictive coded picture from a series of frames of a moving image compressed and encoded using an orthogonal transformation from a space region to a frequency region;
extracting, using the processor, a first block from the first intraframe predictive coded picture;
calculating, using the processor, a first evaluation value indicative of a possibility of presence of a telop in the first block by assigning weights to frequency components in the first block using a weighting matrix such that a higher value is assigned to a frequency component of a higher frequency band;
detecting, using the processor, a telop region that includes a telop from the first block based on the first evaluation value;
acquiring, using the processor, an interframe predictive coded picture that follows the first intraframe predictive coded picture from the series of frames;
extracting, using the processor, from the interframe predictive coded picture, a second block that appears at a position corresponding to a position of the first block in the first intraframe predictive coded picture;
updating, using the processor, a frequency component of the first block from which the telop region is detected, using frequency components of the second block;
acquiring, using the processor, a second intraframe predictive coded picture that is an intraframe predictive coded picture appearing next to the first intraframe predictive coded picture, from the series of frames;
extracting, using the processor, from the second intraframe predictive coded picture, a third block that appears at a position corresponding to positions of the first block and the second block respectively in the first intraframe predictive coded picture and the interframe predictive coded picture;
calculating, using the processor, a second evaluation value indicative of a possibility of presence a telop in the third block by weighting the updated frequency component using the weighting matrix; and
detecting, using the processor, an identical telop region to the telop region from the third block based on the second evaluation value.

4. The telop detecting method according to claim 3, further comprising:
determining, using the processor, whether the first evaluation value is larger than a first threshold; and
identifying, using the processor, the first block as the telop region when the first evaluation value is determined to be larger than the first threshold at the determining.

5. The telop detecting method according to claim 3, further comprising:
determining, using the processor, whether the second evaluation value is larger than a second threshold; and
identifying, using the processor, the third block as the identical telop region to the telop region when the second evaluation value is determined to be larger than the second threshold.

6. A telop detecting method comprising:
acquiring, using a processor, an interframe predictive coded picture from a series of frames of a moving image that is compressed and encoded using an orthogonal transformation from a space region to a frequency region and an interframe correlation;
extracting, using the processor, a notable macro block and at least one of macro blocks present surrounding the notable macro block as a surrounding macro block, from the interframe predictive coded picture;
calculating, using the processor, a first evaluation value indicative of a possibility of presence of a telop in the notable macro block based on a motion vector of the notable macro block and a motion vector of the surrounding macro block;
acquiring, using the processor, an intraframe predictive coded picture that follows the interframe predictive coded picture from the series of frames;
extracting, using the processor, from macro blocks in the intraframe predictive coded picture, a block at a position corresponding to a position of the notable macro block in the interframe predictive coded picture;

calculating, using the processor, a second evaluation value indicative of a possibility of presence of a telop in the block by assigning weights to frequency components in the block using a weighting matrix such that a higher value is assigned to a frequency component of a higher frequency band; and detecting, using the processor, a telop region that includes a telop based on the first evaluation value and the second evaluation value.

7. The telop detecting method according to claim 6, further comprising:

determining, using the processor, whether the first evaluation value is larger than a first threshold and whether the second evaluation value is larger than a second threshold; and identifying, using the processor, the block as a telop region that includes a telop based on a result of determination at the determining, wherein the calculating the first evaluation value includes calculating the first evaluation value by counting frequency of a difference being zero, the difference between the motion vector of the notable macro block and the motion vector of the surrounding macro block is zero.

8. The telop detecting method according to claim 6, further comprising:

determining, using the processor, a type of the telop in the telop region by discriminating between a stationary telop and a roll telop based on the motion vector of the notable macro block and the motion vector of the surrounding macro block; and outputting the determined type.

9. A non-transitory computer-readable recording medium that stores therein a computer program for realizing a telop detecting method on a computer, the computer program causing the computer to execute:

acquiring an intraframe predictive coded picture from a series of frames of a moving image compressed and encoded using an orthogonal transformation from a space region to a frequency region;

extracting a block from the intraframe predictive coded picture;

calculating an evaluation value indicative of a possibility of presence of a telop in the block, by assigning weights to frequency components in the block using a weighting matrix such that a higher value is assigned to a frequency component of a higher frequency band; and detecting a telop region that includes a telop from the frame based on the evaluation value.

10. A non-transitory computer-readable recording medium that stores therein a computer program for realizing a telop detecting method on a computer, the computer program causing the computer to execute:

acquiring a first intraframe predictive coded picture from a series of frames of a moving image compressed and encoded using an orthogonal transformation from a space region to a frequency region;

extracting a first block from the first intraframe predictive coded picture;

calculating a first evaluation value indicative of a possibility of presence of a telop in the first block by assigning weights to frequency components in the first block using a weighting matrix such that a higher value is assigned to a frequency component of a higher frequency band;

detecting a telop region that includes a telop from the first block based on the first evaluation value;

acquiring an interframe predictive coded picture that follows the first intraframe predictive coded picture from the series of frames;

extracting, from the interframe predictive coded picture, a second block that appears at a position corresponding to a position of the first block in the first intraframe predictive coded picture;

updating a frequency component of the first block from which the telop region is detected, using frequency components of the second block;

acquiring a second intraframe predictive coded picture that is an intraframe predictive coded picture appearing next to the first intraframe predictive coded picture, from the series of frames;

extracting, from the second intraframe predictive coded picture, a third block that appears at a position corresponding to positions of the first block and the second block respectively in the first intraframe predictive coded picture and the interframe predictive coded picture;

calculating a second evaluation value indicative of a possibility of presence of a telop in the third block by weighting the updated frequency component using the weighting matrix; and detecting an identical telop region to the telop region from the third block based on the second evaluation value.

11. A non-transitory computer-readable recording medium that stores therein a computer program for realizing a telop detecting method on a computer, the computer program causing the computer to execute:

acquiring an interframe predictive coded picture from a series of frames of a moving image that is compressed and encoded using an orthogonal transformation from a space region to a frequency region and an interframe correlation;

extracting a notable macro block and at least one of macro blocks present surrounding the notable macro block as a surrounding macro block, from the interframe predictive coded picture;

calculating a first evaluation value indicative of a possibility of presence of a telop in the notable macro block based on a motion vector of the notable macro block and a motion vector of the surrounding macro block;

acquiring an intraframe predictive coded picture that follows the interframe predictive coded picture from the series of frames;

extracting, from macro blocks in the intraframe predictive coded picture, a block at a position corresponding to a position of the notable macro block in the interframe predictive coded picture;

calculating a second evaluation value indicative of a possibility of presence of a telop in the block by assigning weights to frequency components in the block using a weighting matrix such that a higher value is assigned to a frequency component of a higher frequency band; and detecting a telop region that includes a telop based on the first evaluation value and the second evaluation value.

12. A telop detecting device comprising:

a processor coupled to a memory, wherein the processor is programmed to detect a telop using:

an acquiring unit that acquires an intraframe predictive coded picture from a series of frames of a moving image compressed and encoded using an orthogonal transformation from a space region to a frequency region;

an extracting unit that extracts a block from the intraframe predictive coded picture;

a calculating unit that calculates an evaluation value indicative of a possibility of presence of a telop in the block, by assigning weights to frequency components in the block using a weighting matrix such that a higher value is assigned to a frequency component of a higher frequency band; and a detecting unit that detects a telop region that includes a telop from the frame based on the evaluation value.

13. A telop detecting device comprising:

a processor coupled to a memory, wherein the processor is programmed to detect a telop using:

a first acquiring unit that acquires a first intraframe predictive coded picture from a series of frames of a moving image compressed and encoded using an orthogonal transformation from a space region to a frequency region;

a first extracting unit that extracts a first block from the first intraframe predictive coded picture;

a calculating unit that calculates a first evaluation value indicative of a possibility of presence of a telop in the first block by assigning weights to frequency components in the first block using a weighting matrix such that a higher value is assigned to a frequency component of a higher frequency band;

a detecting unit that detects a telop region that includes a telop from the first block based on the first evaluation value;

a second acquiring unit that acquires an interframe predictive coded picture that follows the first intraframe predictive coded picture from the series of frames;

a second extracting unit that extracts, from the interframe predictive coded picture, a second block that appears at a position corresponding to a position of the first block in the first intraframe predictive coded picture; and an updating unit that updates a frequency component of the first block from which the telop region is detected, using frequency components of the second block, wherein the first acquiring unit further acquires a second intraframe predictive coded picture that is an intraframe predictive coded picture appearing next to the first intraframe predictive coded picture, from the series of frames, wherein the first extracting unit further extracts, from the second intraframe predictive coded picture, a third block that appears at a position corresponding to positions of the first block and the second block respectively in the first intraframe predictive coded picture and the interframe predictive coded picture, wherein the calculating unit further calculates a second evaluation value indicative of a possibility of presence of a telop in the third block by weighting the updated frequency component using the weighting matrix, and wherein the detecting unit further detects an identical telop region to the telop region from the third block based on the second evaluation value.

14. A telop detecting device comprising:

a processor coupled to a memory, wherein the processor is programmed to detect a telop using:

a first acquiring unit that acquires an interframe predictive coded picture from a series of frames of a moving image that is compressed and encoded using an orthogonal transformation from a space region to a frequency region and an interframe correlation;

a macro block extracting unit that extracts a notable macro block and at least one of macro blocks present surrounding the notable macro block as a surrounding macro block, from the interframe predictive coded picture;

a first calculating unit that calculates a first evaluation value indicative of a possibility of presence of a telop in the notable macro block based on a motion vector of the notable macro block and a motion vector of the surrounding macro block;

a second acquiring unit that acquires an intraframe predictive coded picture that follows the interframe predictive coded picture from the series of frames;

a block extracting unit that extracts, from macro blocks in the intraframe predictive coded picture, a block at a position corresponding to a position of the notable macro block in the interframe predictive coded picture;

a second calculating unit that calculates a second evaluation value indicative of a possibility of presence of a telop in the block by assigning weights to frequency components in the block using a weighting matrix such that a higher value is assigned to a frequency component of a higher frequency band; and a detecting unit that detects a telop region that includes a telop based on the first evaluation value and the second evaluation value.

* * * * *